(12) United States Patent  
Knabenshue et al.

(10) Patent No.: US 11,733,801 B2  
(45) Date of Patent: Aug. 22, 2023

(54) TOUCH SENSOR PANEL ARCHITECTURE WITH MULTIPLE SENSING MODE CAPABILITIES

(71) Applicant: Apple Inc., Cupertino, CA (US)

(72) Inventors: Brian H. Knabenshue, Cupertino, CA (US); Albert Lin, Cupertino, CA (US); Jason C. Hu, Palo Alto, CA (US); Christian M. Sauer, Cupertino, CA (US); Martin Paul Grunthaner, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/146,675

(22) Filed: Sep. 28, 2018

(65) Prior Publication Data

US 2019/0102010 A1 Apr. 4, 2019

Related U.S. Application Data

(60) Provisional application No. 62/566,092, filed on Sep. 29, 2017.

(51) Int. Cl.
*G06F 3/041* (2006.01)
*G06F 3/044* (2006.01)

(52) U.S. Cl.
CPC ...... *G06F 3/041662* (2019.05); *G06F 3/0442* (2019.05); *G06F 3/0445* (2019.05);
(Continued)

(58) Field of Classification Search
CPC .................. G06F 3/0416; G06F 3/044; G06F 2203/04105; G06F 2203/04106; G06F 2203/04107; G06F 2203/04108
See application file for complete search history.

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

CN 105335031 A 2/2016
CN 105992994 A 10/2016
(Continued)

OTHER PUBLICATIONS

International Preliminary Report on Patentability received for PCT Patent Application No. PCT/US2018/000253, dated Feb. 27, 2020, 15 pages.

(Continued)

*Primary Examiner* — Stacy Khoo
(74) *Attorney, Agent, or Firm* — Kubota & Basol LLP

(57) ABSTRACT

A touch sensor panel is disclosed. The touch sensor panel includes a first layer including a plurality of electrodes of a first type that are coupled to respective traces and are configured to operate as touch sensing electrodes during a first time period. The touch sensor panel also includes a second layer including a plurality of electrodes of a second type overlapping with the respective traces of the electrodes of the first type. The electrodes of the second type are configured to operate as guard electrodes for the respective traces of the electrodes of the first type during the first time period and operate as touch sensing electrodes during a second time period.

32 Claims, 17 Drawing Sheets

(52) U.S. Cl.
CPC .......... *G06F 3/0446* (2019.05); *G06F 3/0448* (2019.05); *G06F 3/04162* (2019.05); *G06F 3/04164* (2019.05); *G06F 2203/04105* (2013.01); *G06F 2203/04106* (2013.01); *G06F 2203/04107* (2013.01); *G06F 2203/04108* (2013.01)

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 7,932,897 | B2 | 4/2011 | Elias et al. |
| 8,479,122 | B2 | 7/2013 | Hotelling et al. |
| 8,593,410 | B2 | 11/2013 | Hong et al. |
| 8,754,662 | B1 | 6/2014 | Weng et al. |
| 8,810,543 | B1* | 8/2014 | Kurikawa ........... G06F 3/04166 345/173 |
| 9,075,484 | B2 | 7/2015 | Ritter et al. |
| 9,182,865 | B2 | 11/2015 | Chae |
| 9,261,997 | B2 | 2/2016 | Chang et al. |
| 9,304,641 | B2 | 4/2016 | Kang et al. |
| 9,417,747 | B2 | 8/2016 | Yumoto et al. |
| 9,575,610 | B2 | 2/2017 | Hotelling et al. |
| 9,582,099 | B2 | 2/2017 | Small |
| 9,626,049 | B2 | 4/2017 | Chandran et al. |
| 9,886,141 | B2 | 2/2018 | Yousefpor |
| 9,983,738 | B2 | 5/2018 | Wang et al. |
| 10,429,981 | B2* | 10/2019 | Noguchi ............... G06F 3/0412 |
| 10,739,904 | B2 | 8/2020 | Blondin et al. |
| 2006/0197753 | A1 | 9/2006 | Hotelling |
| 2008/0297174 | A1 | 12/2008 | Narasimhan et al. |
| 2008/0309633 | A1 | 12/2008 | Hotelling et al. |
| 2010/0026660 | A1 | 2/2010 | Kitamura |
| 2010/0110038 | A1 | 5/2010 | Mo et al. |
| 2010/0265188 | A1* | 10/2010 | Chang .................. H01L 27/323 345/173 |
| 2010/0315374 | A1 | 12/2010 | Chen et al. |
| 2012/0050216 | A1 | 3/2012 | Kremin et al. |
| 2013/0100071 | A1 | 4/2013 | Wright et al. |
| 2013/0154996 | A1 | 6/2013 | Trend et al. |
| 2013/0181949 | A1 | 7/2013 | Setlak |
| 2013/0257786 | A1 | 10/2013 | Brown et al. |
| 2013/0285971 | A1 | 10/2013 | Elias et al. |
| 2013/0307823 | A1* | 11/2013 | Grivna ................... G06F 3/044 345/174 |
| 2014/0184552 | A1 | 7/2014 | Tanemura |
| 2014/0210743 | A1 | 7/2014 | Kurasawa et al. |
| 2014/0253499 | A1 | 9/2014 | Lee et al. |
| 2014/0327644 | A1 | 11/2014 | Mohindra |
| 2015/0022494 | A1* | 1/2015 | Azumi .................. G06F 3/0446 345/174 |
| 2015/0035787 | A1 | 2/2015 | Shahpamia et al. |
| 2015/0049043 | A1 | 2/2015 | Yousefpor |
| 2015/0062062 | A1 | 3/2015 | Han et al. |
| 2015/0130742 | A1 | 5/2015 | Chen et al. |
| 2015/0145802 | A1 | 5/2015 | Yao et al. |
| 2015/0205405 | A1 | 7/2015 | Yumoto et al. |
| 2015/0248183 | A1 | 9/2015 | Schwartz et al. |
| 2015/0261377 | A1* | 9/2015 | Reynolds .......... G06F 3/041662 345/174 |
| 2015/0268783 | A1 | 9/2015 | Yoon et al. |
| 2015/0317008 | A1 | 11/2015 | Chandran et al. |
| 2015/0331535 | A1 | 11/2015 | Li et al. |
| 2016/0188039 | A1 | 6/2016 | Yoon |
| 2016/0209962 | A1* | 7/2016 | Nurmi ..................... G06F 3/044 |
| 2016/0306458 | A1 | 10/2016 | Hong et al. |
| 2016/0306466 | A1 | 10/2016 | Gotoh et al. |
| 2016/0328079 | A1 | 11/2016 | Schwartz et al. |
| 2016/0334930 | A1* | 11/2016 | Kim ..................... G06F 3/0446 |
| 2017/0024033 | A1 | 1/2017 | Chandran et al. |
| 2017/0228065 | A1 | 8/2017 | Lee |
| 2017/0228073 | A1 | 8/2017 | Hagihara |
| 2017/0242534 | A1 | 8/2017 | Gray |
| 2017/0277328 | A1* | 9/2017 | Kurasawa ............... G06F 3/044 |
| 2018/0059862 | A1 | 3/2018 | Zeng et al. |
| 2018/0151627 | A1 | 5/2018 | Seo et al. |
| 2018/0157354 | A1 | 6/2018 | Blondin et al. |
| 2018/0217711 | A1* | 8/2018 | Teranishi .......... G06F 3/041662 |
| 2019/0056834 | A1 | 2/2019 | Blondin et al. |
| 2020/0004294 | A1 | 1/2020 | Tan et al. |
| 2020/0103994 | A1 | 4/2020 | Vaze |
| 2020/0371636 | A1 | 11/2020 | Blondin et al. |
| 2023/0011279 | A1 | 1/2023 | Blondin et al. |

FOREIGN PATENT DOCUMENTS

| | | |
|---|---|---|
| CN | 106125997 A | 11/2016 |
| CN | 106557220 A | 4/2017 |
| CN | 106909254 A | 6/2017 |
| CN | 106951125 A | 7/2017 |
| EP | 2660688 A1 | 11/2013 |
| EP | 2930597 A2 | 10/2015 |
| EP | 2937767 A1 | 10/2015 |
| JP | 2000-163031 A | 6/2000 |
| JP | 2002-342033 A | 11/2002 |
| KR | 10-2018-0059035 A | 6/2018 |
| WO | 2013/111237 A1 | 8/2013 |
| WO | 2015/183461 A1 | 12/2015 |
| WO | 2017/020344 A1 | 2/2017 |
| WO | 2017/058413 A1 | 4/2017 |
| WO | WO-2017/124310 A1 | 7/2017 |
| WO | 2019/035978 A2 | 2/2019 |

OTHER PUBLICATIONS

International Search Report and Written Opinion received for PCT Patent Application No. PCT/US2018/000253, dated Feb. 20, 2019, 19 pages.

Non-Final Office Action received for U.S. Appl. No. 15/998,425, dated Nov. 19, 2019, 52 pages.

International Search Report dated Mar. 19, 2019, for PCT Application No. PCT/US2018/053605, nine pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Corrected Notice of Allowability received for U.S. Appl. No. 15/998,425, dated May 26, 2020, 2 pages.

Non-Final Office Action received for U.S. Appl. No. 16/551,698, dated Jul. 8, 2020, 12 pages.

Notice of Allowance received for U.S. Appl. No. 15/998,425, dated Apr. 3, 2020, 14 pages.

Corrected Notice of Allowance received for U.S. Appl. No. 16/551,698, dated May 17, 2021, 2 pages.

International Search Report received for PCT Patent Application No. PCT/US2019/048210, dated Dec. 10, 2019, 6 pages.

Notice of Allowance received for U.S. Appl. No. 16/551,698, dated Apr. 23, 2021, 10 pages.

Notice of Allowance received for U.S. Appl. No. 16/551,698, dated Jan. 21, 2021, 10 pages.

(56) References Cited

OTHER PUBLICATIONS

Non-Final Office Action received for U.S. Appl. No. 16/989,645, dated Aug. 25, 2021, 53 pages.
Notice of Allowance received for U.S. Appl. No. 16/989,645, dated Jan. 20, 2022, 19 pages.
Search Report received for Chinese Patent Application No. 201880051180.2, dated Jan. 5, 2023, 6 pages (3 pages of English Translation and 3 pages of Official Copy).
Wang, et al., "Inductor Winding Capacitance Cancellation Using Mutual Capacitance Concept For Noise Reduction Application," IEEE Transactions on Electromagnetic Compatibility, May 31, 2006, pp. 311-318.

* cited by examiner

| MODE | STYLUS SENSING | TOUCH/HOVER SENSING | TOUCH SENSING | | FORCE SENSING | | | |
|---|---|---|---|---|---|---|---|---|
| | S | SC | MC1 | MC2 | F1 | F2 | F3 | F4 |
| L1 | SENSE | GUARD/ SELF-CAPACITANCE | SENSE | DRIVE | X | DRIVE | X | X |
| L2 | SENSE | SELF-CAPACITANCE | DRIVE | SENSE | DRIVE | X | SENSE | DRIVE |
| L3 | GUARD | GUARD | GUARD | GUARD | SENSE | SENSE | DRIVE | SENSE |

FIG. 5E

| | S MODE | | |
|---|---|---|---|
| | S-A | S-B | S-C |
| L1 | SENSE | SENSE | SENSE |
| L2 | SENSE AT LEAST ONE ELECTRODE | SENSE AT LEAST ONE ROW/ COLUMN OF ELECTRODES | SENSE ALL ROWS/COLUMNS OF ELECTRODES |
| L3 | GUARD | GUARD | GUARD |

FIG. 5F

| | SC MODE | | | |
|---|---|---|---|---|
| | SC-A | SC-B | SC-C | SC-D |
| L1 | GUARD | GUARD | GUARD | GUARD |
| L2 | ALL ELECTRODES OPERATED AS SELF-CAPACITANCE ELECTRODES | A SUBSET OF ELECTRODES OPERATED AS SELF-CAPACITANCE ELECTRODES, AND REMAINING ELECTRODES OPERATED AS GUARD | A SUBSET OF ELECTRODES OPERATED AS SELF-CAPACITANCE ELECTRODES, AND REMAINING ELECTRODES COUPLED TO GROUND | A FIRST SUBSET OF ELECTRODES OPERATED AS SELF-CAPACITANCE ELECTRODES, A SECOND SUBSET OF ELECTRODES OPERATED AS GUARD, AND REMAINING ELECTRODES COUPLED TO GROUND |
| L3 | GUARD | GUARD | GUARD | GUARD |

FIG. 5G

| | MC1 MODE | | |
|---|---|---|---|
| | MC1-A | MC1-B | MC1-C |
| L1 | SENSE | SENSE | SENSE |
| L2 | DRIVE AT LEAST ONE ELECTRODE | DRIVE AT LEAST ONE ROW/COLUMN OF ELECTRODES | DRIVE ALL ROWS/COLUMNS OF ELECTRODES |
| L3 | GUARD | GUARD | GUARD |

*FIG. 5H*

| | MC2 MODE | | |
|---|---|---|---|
| | MC2-A | MC2-B | MC2-C |
| L1 | DRIVE | DRIVE | DRIVE |
| L2 | SENSE AT LEAST ONE ELECTRODE | SENSE AT LEAST ONE ROW/COLUMN OF ELECTRODES | SENSE ALL ROWS/COLUMNS OF ELECTRODES |
| L3 | GUARD | GUARD | GUARD |

*FIG. 5I*

| MODE | STYLUS SENSING | TOUCH/HOVER SENSING | TOUCH SENSING | | | | | FORCE SENSING | | |
|---|---|---|---|---|---|---|---|---|---|---|
| | S | SC | MC1/2 | MC3/4 | MC5/6 | MC7/8 | | F1/2 | F3/4 | F5/6 |
| L1 | SENSE | GUARD | SENSE/DRIVE | X | SENSE/DRIVE | SENSE/DRIVE | | SENSE/DRIVE | X | X |
| L2 | SENSE | GUARD | DRIVE/SENSE | SENSE/DRIVE | X | DRIVE/SENSE | | X | SENSE/DRIVE | X |
| L3 | X | SELF-CAPACITANCE | X | DRIVE/SENSE | DRIVE/SENSE | X | | DRIVE/SENSE | DRIVE/SENSE | DRIVE/SENSE |
| L4 | GUARD | GUARD | GUARD | GUARD | GUARD | X | | GUARD | GUARD | SENSE/DRIVE |

*FIG. 6E*

| S MODE | | | |
|---|---|---|---|
| S-A | S-B | S-C | S-D |
| SENSE | SENSE | SENSE | SENSE |
| SENSE | SENSE | SENSE | SENSE |
| SENSE AT LEAST ONE ELECTRODE | SENSE AT LEAST ONE ROW/COLUMN OF ELECTRODES | SENSE ALL ROWS/COLUMNS OF ELECTRODES | GUARD |
| GUARD | GUARD | GUARD | GUARD |

*FIG. 6F*

|    | SC MODE | | | |
|----|---------|---|---|---|
|    | SC-A | SC-B | SC-C | SC-D |
| L1 | GUARD | GUARD | GUARD | GUARD |
| L2 | GUARD | GUARD | GUARD | GUARD |
| L3 | ALL ELECTRODES OPERATED AS SELF-CAPACITANCE ELECTRODES | A SUBSET OF ELECTRODES OPERATED AS SELF-CAPACITANCE ELECTRODES, AND REMAINING ELECTRODES OPERATED AS GUARD | A SUBSET OF ELECTRODES OPERATED AS SELF-CAPACITANCE ELECTRODES, AND REMAINING ELECTRODES COUPLED TO GROUND | A FIRST SUBSET OF ELECTRODES OPERATED AS SELF-CAPACITANCE ELECTRODES, A SECOND SUBSET OF ELECTRODES OPERATED AS GUARD, AND REMAINING ELECTRODES COUPLED TO GROUND |
| L4 | GUARD | GUARD | GUARD | GUARD |

*FIG. 6G*

|    | MC3 MODE | | |
|----|---------|---|---|
|    | MC3-A | MC3-B | MC3-C |
| L1 | X | X | X |
| L2 | SENSE | SENSE | SENSE |
| L3 | DRIVE AT LEAST ONE ELECTRODE | DRIVE AT LEAST ONE ROW/COLUMN OF ELECTRODES | DRIVE ALL ROWS/COLUMNS OF ELECTRODES |
| L4 | GUARD | GUARD | GUARD |

*FIG. 6H*

| | MC4 MODE | | |
|---|---|---|---|
| | MC4-A | MC4-B | MC4-C |
| L1 | X | X | X |
| L2 | DRIVE | DRIVE | DRIVE |
| L3 | SENSE AT LEAST ONE ELECTRODE | SENSE AT LEAST ONE ROW/COLUMN OF ELECTRODES | SENSE ALL ROWS/COLUMNS OF ELECTRODES |
| L4 | GUARD | GUARD | GUARD |

*FIG. 6I*

| | MC5 MODE | | |
|---|---|---|---|
| | MC5-A | MC5-B | MC5-C |
| L1 | SENSE | SENSE | SENSE |
| L2 | X | X | X |
| L3 | DRIVE AT LEAST ONE ELECTRODE | DRIVE AT LEAST ONE ROW/COLUMN OF ELECTRODES | DRIVE ALL ROWS/COLUMNS OF ELECTRODES |
| L4 | GUARD | GUARD | GUARD |

*FIG. 6J*

| | MC6 MODE | | |
|---|---|---|---|
| | MC6-A | MC6-B | MC6-C |
| L1 | DRIVE | DRIVE | DRIVE |
| L2 | X | X | X |
| L3 | SENSE AT LEAST ONE ELECTRODE | SENSE AT LEAST ONE ROW/COLUMN OF ELECTRODES | SENSE ALL ROWS/COLUMNS OF ELECTRODES |
| L4 | GUARD | GUARD | GUARD |

*FIG. 6K*

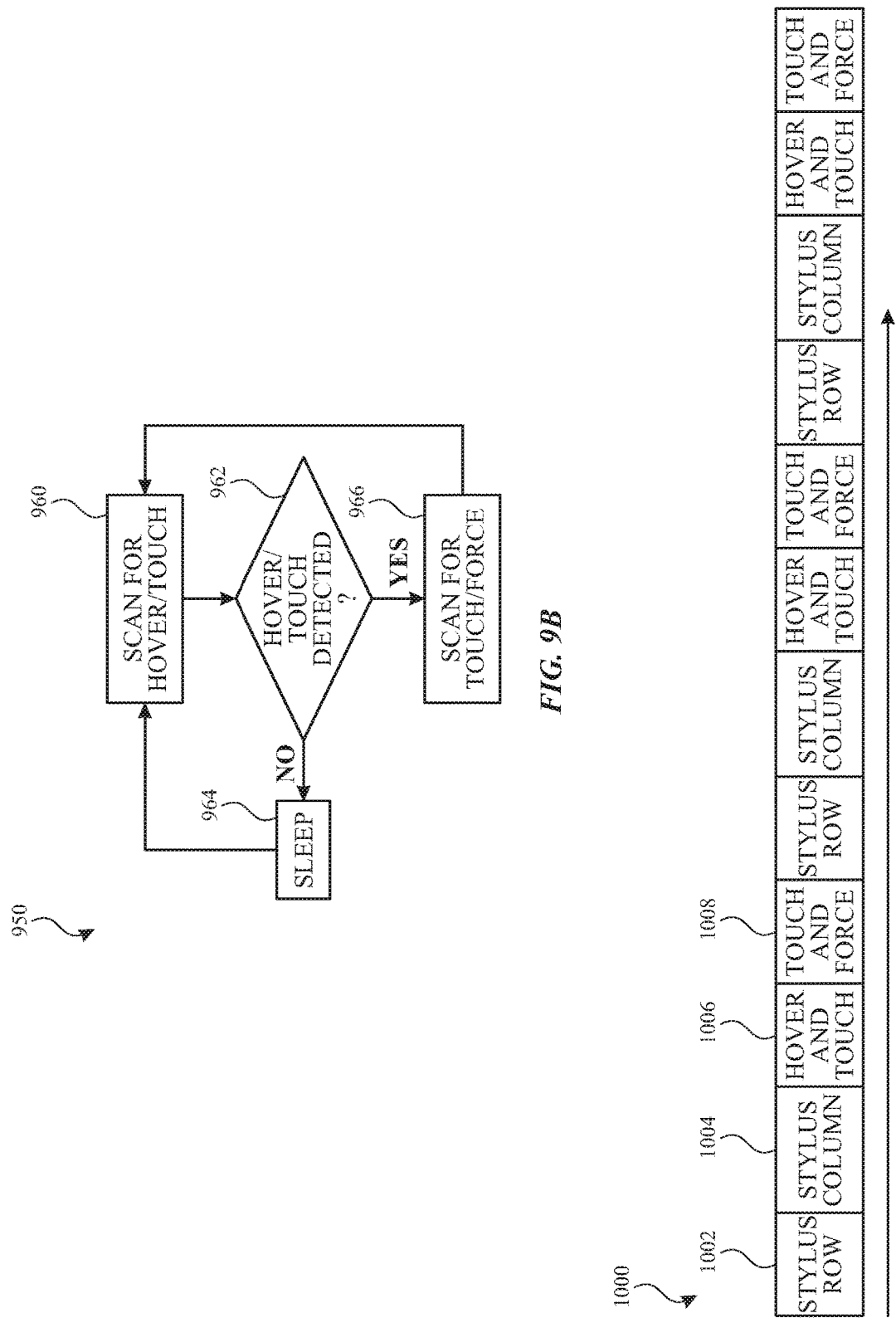

A touch sensor panel comprising:

A first layer including a plurality of electrodes of a first type, wherein the electrodes of the first type are configured to, during a first time period, operate as mutual capacitance drive electrodes A second layer including a plurality of electrodes of a second type overlapping with the electrodes of the first type, wherein the plurality of electrodes of the second type are arranged in one or more rows and columns, and a respective row or column of the one or more rows and columns in the second layer includes at least a first electrode and a second electrode of the second type, and the first electrode and second electrode are configured to:

During the first time period, operate as a combined mutual capacitance sense electrode comprising the first electrode and the second electrode coupled to a same sensing circuitry During the second time period, operate as self-capacitance electrodes that are sensed individually by different sense circuitry

FIG. 11

TOUCH SENSOR PANEL ARCHITECTURE WITH MULTIPLE SENSING MODE CAPABILITIES

CROSS-REFERENCE TO RELATED APPLICATIONS

This application claims benefit of U.S. Provisional Patent Application No. 62/566,092, filed Sep. 29, 2017, which is hereby incorporated by reference in its entirety.

FIELD OF THE DISCLOSURE

This relates generally to touch sensor panels, and more particularly to touch sensor panels with multiple sensing mode capabilities.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by substantially transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

There are many types of sensing that can be performed on a touch sensor panel. In some examples, touch sensor panels can perform hover, touch, force, and/or stylus sensing. These different types of sensing capabilities can be performed using various touch electrode configurations for mutual capacitance and/or self-capacitance sensing. Further, touch sensing performance of touch sensor panels may benefit from having various guard/shield elements in the touch sensor panels that help shield certain touch sensing circuitry (e.g., touch electrodes) from noise sources that can otherwise inject noise into touch sensing signals. Having dedicated circuitry (e.g., electrodes) for each of these sensing and/or guarding capabilities can result in complex, expensive, and/or thick touch sensor panels. The examples of the disclosure provide various touch sensing system configurations that can operate the same touch circuitry (e.g., electrodes) in different modes to perform hover, touch, force, and/or stylus sensing and/or guarding functions. Doing so can help improve and/or provide hover, touch, and/or force sensing capabilities to the system while reducing the number of electrodes and corresponding routing traces.

BRIEF DESCRIPTION OF THE DRAWINGS

FIGS. 5E-5I illustrate exemplary tables describing different modes of operation for exemplary touch sensor panel configurations with three layers of electrodes according to examples of the disclosure.

FIGS. 6E-6K illustrate exemplary tables describing different modes of operation for exemplary touch sensor panel configurations with four layers of electrodes according to examples of the disclosure.

FIG. 9B illustrates an exemplary process for switching between modes of operation of exemplary touch sensor panel configurations according to examples of the disclosure.

FIG. 10 illustrates an exemplary timeline of the modes of operation for exemplary touch sensor panel configurations according to examples of the disclosure.

FIG. 11 illustrates a touch sensor panel.

DETAILED DESCRIPTION

Figure 1A:
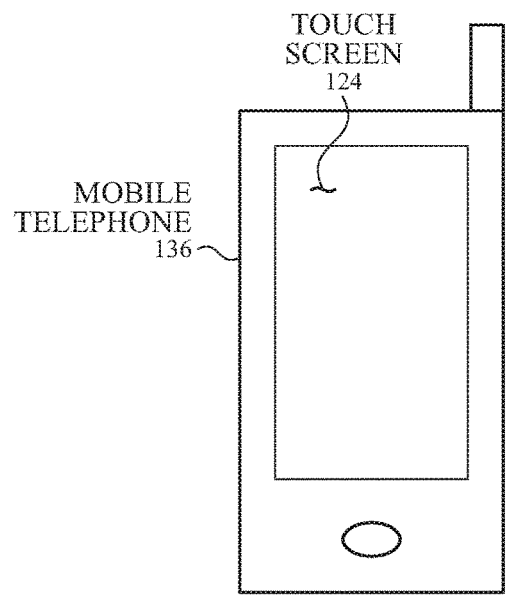
FIGS. 1A-1D illustrate example systems in which a touch screen according to examples of the disclosure may be implemented.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Generally, touch sensor panels comprise a plurality of plates formed from a conductive material; these plates are referred to herein as "touch electrodes." The touch electrodes may be made from any suitable conductive material (e.g., a transparent conductive oxide such as ITO or aluminum zinc oxide, a metal such as copper, a metal mesh material comprising a conductive cross-hatched metal structure with gaps between cross-hatched metal lines, carbon nanotube material, or any other suitable conductive material) which may be substantially transparent or non-transparent, depending on the application. In some instances where the touch electrodes are substantially transparent, the touch sensor panel may be placed on or otherwise integrated into a display (e.g., the touch electrodes may be placed within the display stack and/or may be utilized during the operation of the display to provide display functionality) to provide a touch sensitive display.

During operation of the touch sensor panels described here, a given touch electrode or plurality of electrodes may be configured to perform mutual capacitance touch sensing or a self-capacitance touch sensing. It should be appreciated that a given electrode may be used to perform mutual capacitance touch sensing at one point in time and self-capacitance touch sensing at a different point in time (e.g., by reconfiguring the touch sensor circuitry used to operate the touch electrode, or connecting the touch electrode to different touch sensor circuitry), but some of the touch electrodes may be dedicated to mutual capacitance sensing where a given touch electrode can be stimulated with an AC waveform (e.g., the "drive electrode") and the mutual capacitance between that electrode and another touch electrode can be sensed at the other electrode (e.g., the "sense electrode"). To facilitate mutual capacitance sensing, a touch sensor panel may have touch electrodes arranged in rows and columns where a mutual capacitance may be measured at an overlap or adjacency of a row and a column. In these instances it may be desirable for the rows and columns to have a relatively high aspect ratio (e.g., elongated electrodes with relatively high aspect ratio 1:x where 1 represents a height or width of the electrode and x represents the other of the height or width of the electrode, e.g., where x is greater than 4, 5, 10, 15, 20, etc.), and in some instances a row or column may span a relatively large portion of the touch sensor panel (e.g., at least a quarter of the panel, at least half of the panel, or at least three quarters of the panel). Mutual capacitance sensing can determine the location of a touch on the touch sensor panel with relatively high precision, but may have trouble detecting objects (e.g., fingers) further away from the touch sensor panel (e.g., hovering over the touch sensor panel).

Conversely, the self-capacitance of a given touch electrode can be sensed by stimulating the touch electrode with an AC waveform, and measuring the self-capacitance to ground of that same touch electrode. When one or more electrodes of a touch sensor panel are operated in a self-capacitance sensing mode, the electrodes can effectively detect the locations of one or more objects (e.g., fingers) hovering over and/or touching the touch sensor panels, but may be susceptible to noise and jitter that can introduce errors and/or offsets into the touch outputs of the touch sensor panels. Generally, touch panels optimized for self-capacitance utilize a matrix architecture in which electrodes are arranged in a two-dimensional array to form rows and columns, each row and column comprising a respective plurality of electrodes. The individual electrodes are approximately the same size (although it should be appreciated that some electrodes may be larger or smaller to accommodate routing traces or to balance the bandwidth of individual electrodes). Generally it is desirable for the self-capacitance electrodes to have a relatively low aspect ratio (e.g., relatively low aspect ratio 1:x as discussed above, where x is less than or equal to 4, 5, 10, 15, 20, and preferably less than or equal to 1.5). Depending on the size of the panel and the pitch/size of individual electrodes, a matrix architecture of self-capacitance touch node electrodes can require a large number of self-capacitance touch electrodes and corresponding routing traces. Therefore, it can be beneficial to combine touch electrodes that are operated to sense mutual capacitance and self-capacitance in a single touch sensor panel. The examples of the disclosure provide various touch sensing system configurations that can operate the same touch circuitry (e.g., electrodes) in different modes to perform hover, touch, force, and/or stylus sensing and/or guarding functions. Doing so can help improve and/or provide hover, touch, and/or force sensing capabilities to the system while reducing the number of electrodes and corresponding routing traces.

Figure 1B:
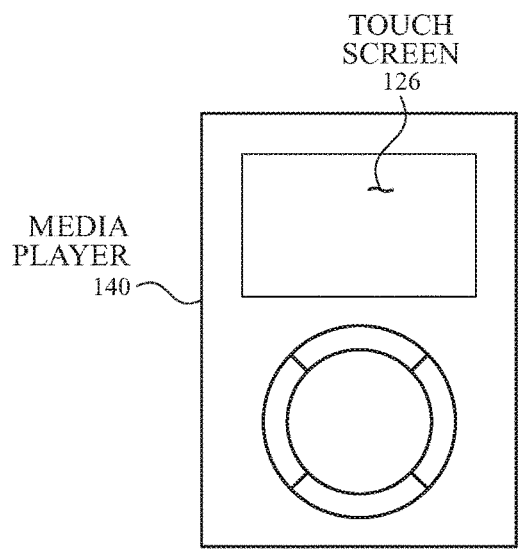
Figure 1C:
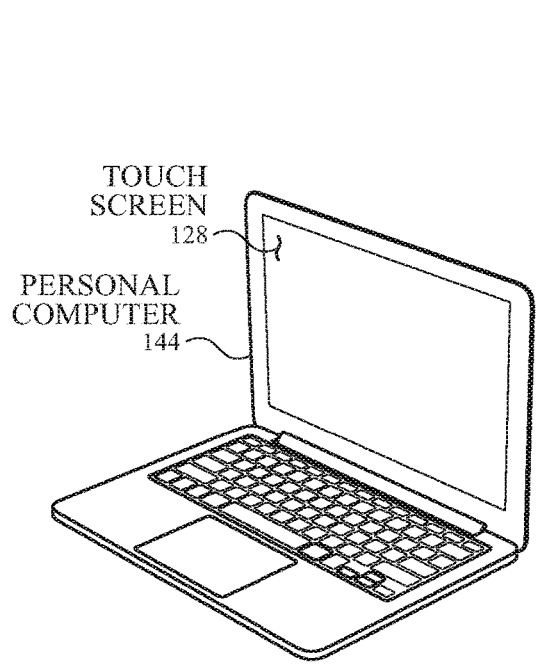
Figure 1D:
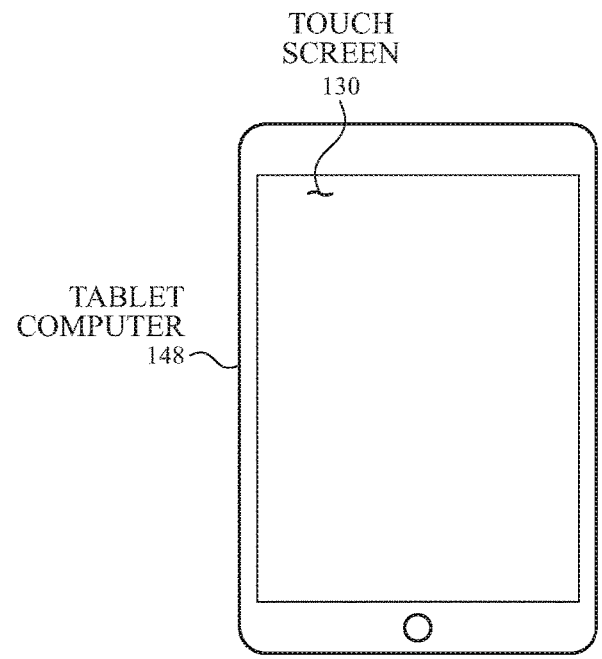

FIGS. 1A-1D illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

In some examples, touch screens 124, 126, 128 and 130 can be configured and optimized to operate using a combination of self-capacitance and mutual capacitance sensing. For example, a self-capacitance mode can be used for touch and/or hover sensing, and a mutual capacitance mode can be used for touch and/or force sensing. A self-capacitance and mutual capacitance hybrid touch system can include a matrix of small, individual plates of conductive material that can be referred to as touch node electrodes (e.g., electrodes with relatively low aspect ratio, as described above) for performing self-capacitance touch measurements in a self-capacitance mode and mutual capacitance touch measurements in a mutual capacitance mode. The touch screen system can also include a plurality of elongated electrodes in a row/column configuration (e.g., electrodes with relatively high aspect ratio) on a different layer that can be operated as an active guard (e.g., to shield the traces of the touch node electrodes), can be used to perform self-capacitance touch measurements during the self-capacitance mode and can be operated as sense and/or drive electrodes during the mutual capacitance mode. The plurality of elongated electrodes may all be on the same layer and be placed along the same direction (e.g., in a row/column configuration) or may be placed on two different layers with a first set of elongated electrodes in a first layer in a first direction (e.g., in a row configuration) and a second set of elongated electrodes on a second layer in a second direction, different than the first layer and the first direction (e.g., in a column configuration) such that the elongated electrodes may cross over each other on different layers (as described below with reference to touch screen 220 in FIG. 2). When the electrodes are operated as drive electrodes and sense electrodes, the crossings (e.g., when the elongated electrodes are on two different layers) or adjacent locations (e.g., when the elongated electrodes are on one layer) of the elongated electrodes can be referred to as mutual capacitance touch nodes. When the electrodes are used to perform self-capacitance touch measurements, the electrodes can be referred to as self-capacitance touch node electrodes. Self-capacitance touch node electrodes and mutual capacitance touch nodes are discussed in turn.

A self-capacitance and mutual capacitance hybrid touch screen can include a plurality of individual touch node electrodes, each touch node electrode identifying or representing a unique location on the touch screen at which touch or proximity (i.e., a touch or proximity event) is to be sensed and each touch node electrode being electrically isolated from the other touch node electrodes in the touch screen/panel. The touch node electrodes can be on the same or different material layers on touch sensor panel. It is understood that in some examples the touch node electrodes on the touch screen can be operated in a self-capacitance sensing mode in which their self-capacitance is sensed, and in some examples can be used to perform scans other than self-capacitance scans on the touch screen (e.g., mutual capacitance scans in combination with or instead of mutual capacitance scans of the row and column electrodes). During self-capacitance operation, a touch node electrode can be stimulated with an AC waveform, and the self-capacitance to ground of the touch node electrode can be measured. As an object approaches the touch node electrode, the self-capacitance to ground of the electrode can change. This change in the self-capacitance of the touch node electrode can be detected and measured by the touch sensing system to determine the positions of multiple objects (e.g., styli and/or fingers) when they touch, or come in proximity to, the touch screen. In some examples, a touch screen can be multi-touch, single touch, projection scan, full-imaging multi-touch, capacitive touch, etc.

As discussed above, a self-capacitance and mutual capacitance hybrid touch screen can also include a plurality of row electrodes (e.g., elongated electrodes disposed as rows) and a plurality of column electrodes (e.g., elongated electrodes disposed as columns). In some examples, the row electrodes can be configured as drive electrodes, and the column electrodes can be configured as sense electrodes (or vice versa), which can form mutual capacitance touch nodes at the intersections (or adjacent locations) of the drive and sense electrodes. In some examples, touch node electrodes with a relatively low aspect ratio can be grouped in columns or rows and be operated as sense and/or drive electrodes. The drive and sense electrodes can be on the same or different material layers on the touch screen. In some examples, the drive circuitry used to drive the drive electrodes and the sense circuitry used to sense the sense electrodes can be fixed, or can be variable such that the drive and sense designations of the row and column electrodes, respectively, can be switched during touch screen operation (e.g., the row electrodes can become sense electrodes, and the column electrodes can become drive electrodes). It is understood that the row and column designations of the above electrodes is not necessarily tied to any specific orientation of the device with which the touch screen is integrated, and that such designation can be relative to any suitable reference point.

During operation, the drive electrodes can be stimulated with an AC waveform (e.g., the same or different AC waveform that stimulates the touch node electrodes described previously in the self-capacitance configuration), and the mutual capacitance of the mutual capacitance touch nodes can be measured via the sense electrodes. As an object approaches the touch node, the mutual capacitance of the mutual capacitance touch node can change. This change in the mutual capacitance of the touch node can be detected and measured by the touch sensing system to determine the positions of multiple objects when they touch, or come in proximity to, the touch screen. It is understood that, in some examples, the row and column electrodes on the touch screen can be used to perform scans other than mutual capacitance scans of the touch screen (e.g., self-capacitance scans in combination with or instead of the touch node electrodes described previously).

Figure 2:
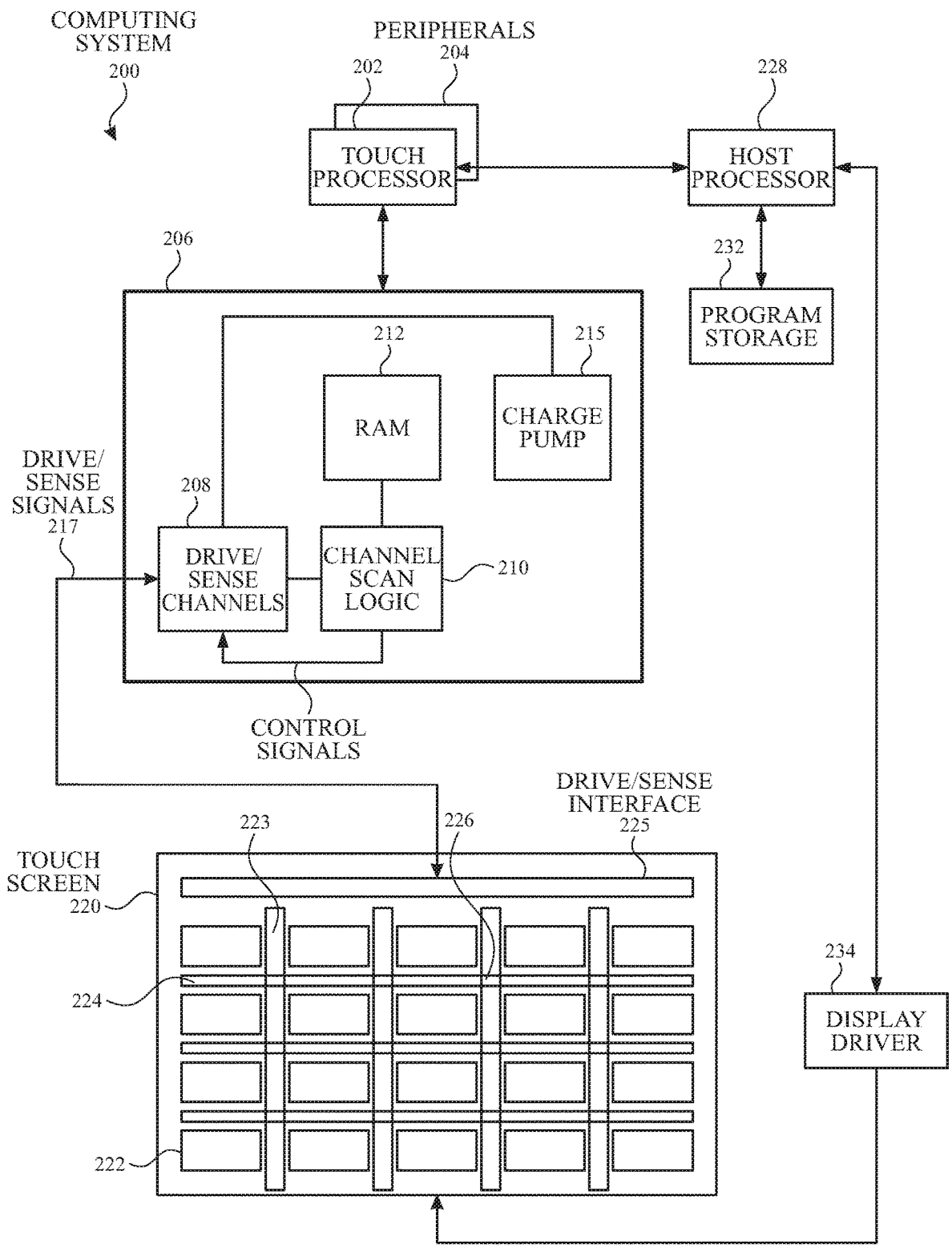
FIG. 2 is a block diagram of an example computing system that illustrates one implementation of an example touch screen according to examples of the disclosure.

FIG. 2 is a block diagram of an example computing system 200 that illustrates one implementation of an example self-capacitance and mutual capacitance hybrid touch screen 220 according to examples of the disclosure. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch driving and/or sensing circuitry (described in more detail below). Peripherals 204 can include, but are not limited to, random access memory (RAM) or other types of memory or storage, watchdog timers and the like. Touch controller 206 can include, but is not limited to, one or more drive/sense channels 208 and channel scan logic 210. Channel scan logic 210 can access RAM 212, autonomously read data from drive/sense channels 208 and provide control for the drive/sense channels. In addition, channel scan logic 210 can control drive/sense channels 208 to generate stimulation signals at various frequencies and phases that can be selectively applied to the touch node electrodes and/or row and column electrodes of touch screen 220, as described in more detail below. In some examples, touch controller 206, touch processor 202 and peripherals 204 can be integrated into a single application-specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 and a plurality of column electrodes 223 and a plurality of row electrodes 224 (e.g., a plurality of elongated touch electrodes disposed as rows and a plurality of elongated electrodes disposed as columns, respectively). Touch node electrodes 222, column electrodes 223, and row electrodes 224 can each be on a different layer (e.g., touch node electrodes in a first layer, column electrodes 223 on a second layer, and row electrodes 224 on a third layer, wherein the first, second, and third layers are different). In a mutual capacitance configuration, the intersection of column electrodes 223 and row electrodes 224 can form mutual capacitance touch nodes 226, as discussed above. In a self-capacitance mode, touch node electrodes 222 can be coupled to drive/sense channels 208 in touch controller 206, can be driven by stimulation signals from the drive/sense channels through drive/sense interface 225, and can be sensed for self-capacitance by the sense channels through the drive/sense interface as well, as described above. In a mutual capacitance mode, touch node electrodes 222 can be coupled to drive channels or sense channels 208 in touch controller 206 and can be driven by stimulation signals from the drive channels through drive/sense interface 225 (if coupled to drive channels), and can be sensed by the sense channels through the drive/sense interface as well (if coupled to sense channels), as described above. Additionally or alternatively in the mutual capacitance mode, column electrodes 223 can be coupled to drive channels 208 in touch controller 206, can be driven by stimulation signals from the drive channels through drive/sense interface 225, and row electrodes 224 can be sensed by the sense channels through the drive/sense interface as well, as described above. Labeling the locations used to detect touch (i.e., touch node electrodes 222 and mutual capacitance touch nodes 226) as "touch nodes" (or "touch node" electrodes) can be particularly useful when touch screen 220 is viewed as capturing an "image" of touch (e.g., a "touch image"). In other words, after touch controller 206 has determined an amount of touch detected at each touch node electrode 222 and/or mutual capacitance touch node 226 in touch screen 220, the pattern of touch nodes or touch node electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as a display driver 234 (e.g., for controlling operation of a display, such as an LCD display, on OLED display, etc.). The display driver 234 can provide voltages on select (e.g., gate) lines to each pixel transistor and can provide data signals along data lines to these same transistors to control the pixel display image as described in more detail below. Host processor 228 can use display driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3:
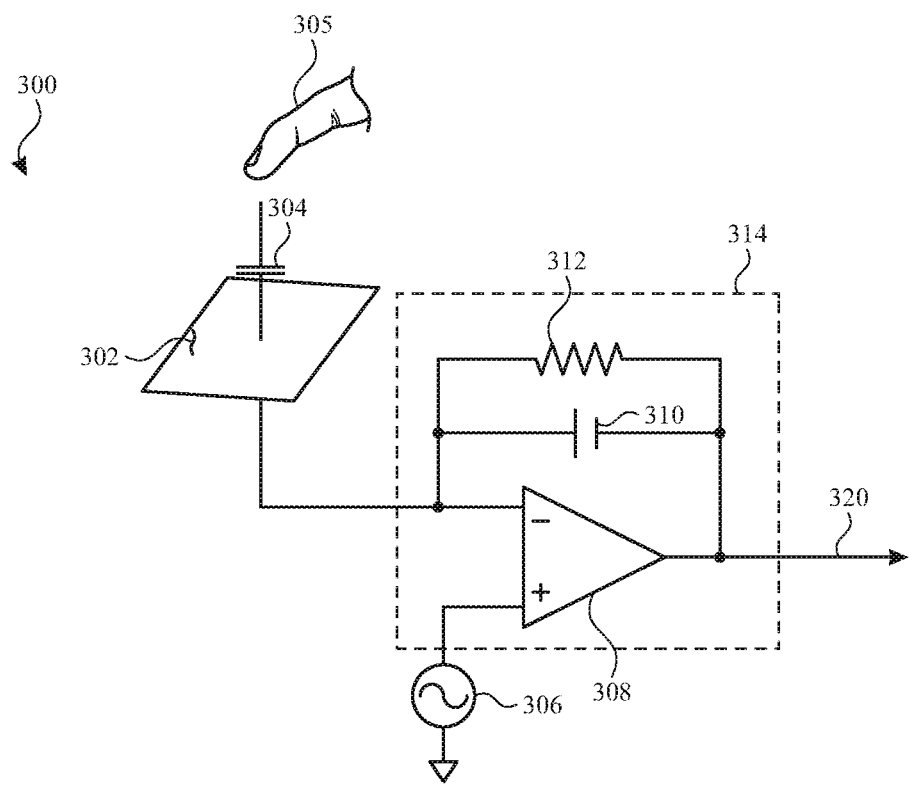
FIG. 3 illustrates an exemplary touch sensor circuit for performing a self-capacitance measurement using an electrode and sensing circuit according to examples of the disclosure.

FIG. 3 illustrates an exemplary touch sensor circuit 300 for performing a self-capacitance measurement using an electrode (e.g., a touch node electrode 302) and sensing circuit 314 according to examples of the disclosure. Sensing circuit 314 can be included in sense channels 208 to sense the self-capacitance of one or more touch electrodes on the touch sensor panels/touch screens of the disclosure. Touch node electrode 302 can correspond to a touch node electrode 222, a column electrode 223, or a row electrode 224 when operated in a self-capacitance mode. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 4:
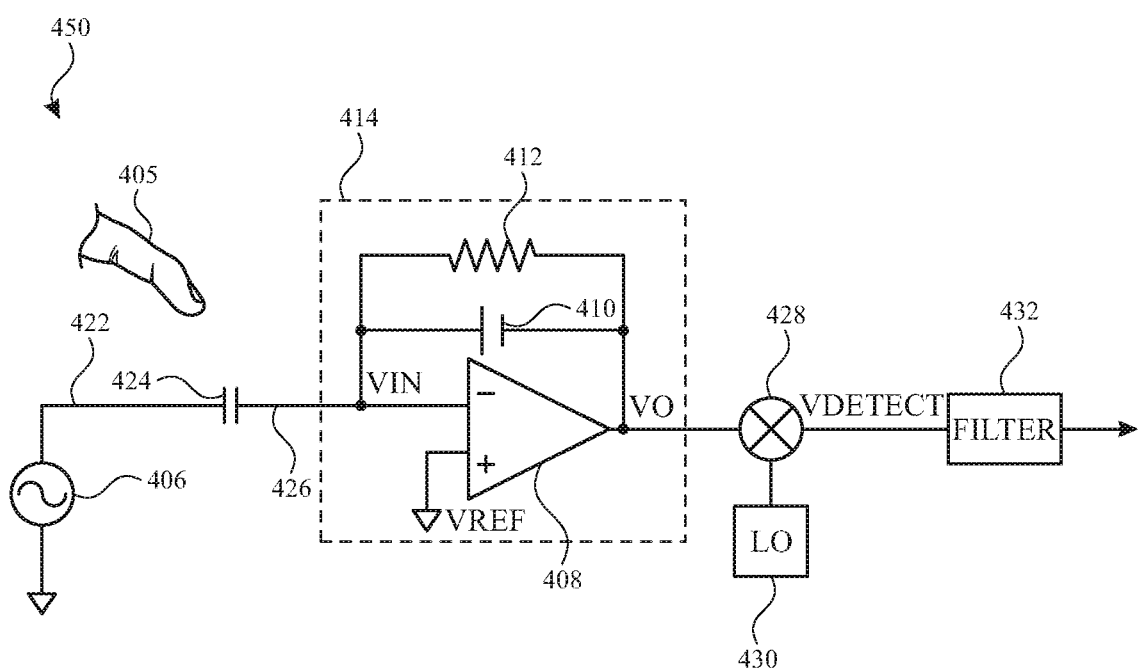
FIG. 4 illustrates an exemplary touch sensor circuit for performing a mutual capacitance measurement using two electrodes and sensing circuit according to examples of the disclosure.

FIG. 4 illustrates an exemplary touch sensor circuit 450 for performing a mutual capacitance measurement using two electrodes (a drive electrode 422 and sense electrode 426, such as the column electrodes and row electrodes described previously) and sensing circuit 414 according to examples of the disclosure. Stimulation signal 406 can be generated by drive channels 208 (e.g., drive channels 208 can include an AC stimulation source 406), drive electrode 422 can correspond to column electrode 223, sense electrode 426 can correspond to row electrode 224, and sensing circuit 414 can be included in sense channels 208. Drive electrode 422 can be stimulated by stimulation signal 406 (e.g., an AC voltage signal). Stimulation signal 406 can be capacitively coupled to sense electrode 426 through mutual capacitance 424 between drive electrode 422 and sense electrode 426. When a finger or object 405 approaches the touch node created by the intersection of drive electrode 422 and sense electrode 426, mutual capacitance 424 can be altered. The intersection of drive electrode 422 and sense electrode 426 can correspond to a mutual capacitance touch node 226. This change in mutual capacitance 424 can be detected to indicate a touch or proximity event at the touch node, as described previously and below. The sense signal coupled onto sense electrode 426 can be received by sensing circuit 414. Sensing circuit 414 can include operational amplifier 408 and at least one of a feedback resistor 412 and a feedback capacitor 410. FIG. 4 illustrates a general case in which both resistive and capacitive feedback elements are utilized. The sense signal (referred to as Vin) can be inputted into the inverting input of operational amplifier 408, and the non-inverting input of the operational amplifier can be coupled to a reference voltage Vref. Operational amplifier 408 can drive its output to voltage Vo to keep Vin substantially equal to Vref, and can therefore maintain Vin constant or virtually grounded. A person of skill in the art would understand that, in this context, equal can include deviations of up to 15%. Therefore, the gain of sensing circuit 414 can be mostly a function of the ratio of mutual capacitance 424 and the feedback impedance, comprised of resistor 412 and/or capacitor 410. The output of sensing circuit 414 Vo can be filtered and heterodyned or homodyned by being fed into multiplier 428, where Vo can be multiplied with local oscillator 430 to produce Vdetect. Vdetect can be inputted into filter 432. One skilled in the art will recognize that the placement of filter 432 can be varied; thus, the filter can be placed after multiplier 428, as illustrated, or two filters can be employed: one before the multiplier and one after the multiplier. In some examples, there can be no filter at all. The direct current (DC) portion of Vdetect can be used to determine if a touch or proximity event has occurred.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays, such as one or more pixel transistors (e.g., thin film transistors (TFTs)), gate lines, data lines, touch node electrodes and common electrodes. In a given display pixel, a voltage between a touch node electrode and a common electrode can control a luminance of the display pixel. The voltage on the touch node electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

As previously mentioned, it can be beneficial to combine mutual capacitance and self-capacitance sensing of touch electrodes in a single touch sensor panel. Specifically, examples of the disclosure provide various touch sensing system configurations that can operate the same touch circuitry (e.g., electrodes) in different modes to perform hover, touch, force, and/or stylus sensing and/or guarding functions. These exemplary configurations can improve and/or provide hover, touch, and/or force sensing capabilities to the system while reducing the number of electrodes and corresponding routing traces.

Figure 5A:
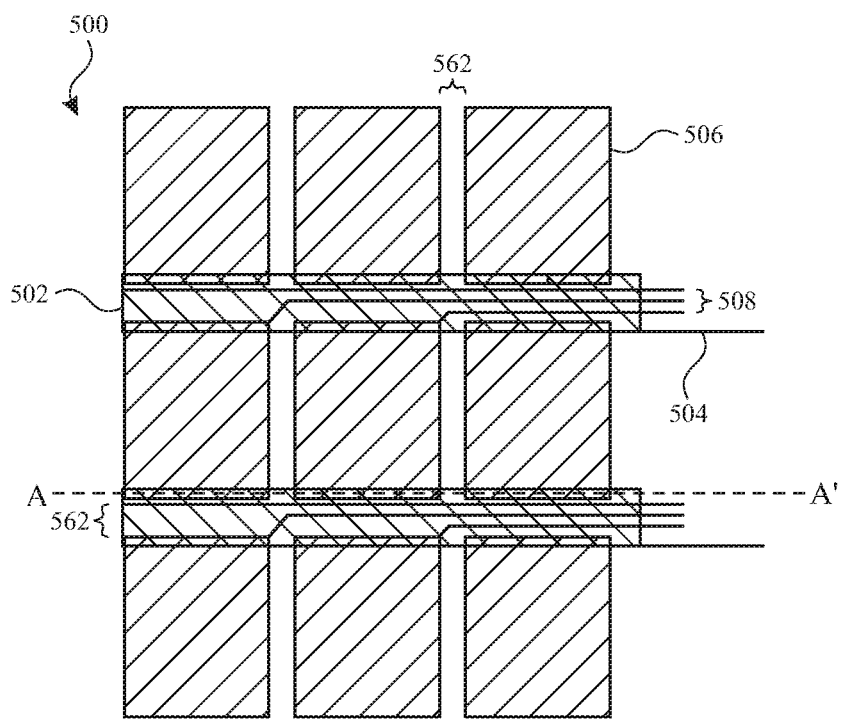
FIGS. 5A-5D illustrate exemplary touch sensor panel configurations with three layers of electrodes according to examples of the disclosure.

FIGS. 5A-5D illustrate exemplary touch sensor panel configurations with three layers of electrodes according to examples of the disclosure. Specifically, touch sensor panel 500 of FIG. 5A illustrates elongated electrodes 502 (e.g., electrodes with relatively high aspect ratio) with corresponding traces 504 along a first direction on a first layer (e.g., row electrodes), and touch node electrodes 506 and corresponding traces 508 on a second layer, different from the first layer. In some examples, elongated electrodes 502 can be disposed with gaps 562 in between rows and/or columns of touch node electrodes 506. Corresponding traces 508 can be disposed in the gaps 562 between rows (or columns) of touch node electrodes 506 (e.g., as shown in FIG. 5A). In some examples, traces 508 can be disposed in the same first direction as elongated electrodes 502. In some examples, elongated electrodes 502 can be disposed over the gaps 562 between rows of touch node electrodes 506 (e.g., closer to the touch surface of touch screen 500 where an object touches the touch screen) such that elongated electrodes 502 completely overlap routing traces 508 of touch node electrodes 506 and, in some examples, partially overlap touch node electrodes 506 (e.g., as shown in FIG. 5A). In some examples, touch sensor panel 500 can include a third layer below the first and second layers (e.g., further away from the touch surface of touch screen 500) comprising a continuous conductive material (e.g., ITO) that can be electrically coupled to a voltage source (e.g., can be driven by a voltage source to form a shield) or ground to act as a guard layer (shown in FIG. 5B). In some examples, this voltage source can be the same AC voltage source that is used to stimulate the electrodes on the first and second layers (e.g., at the same frequency, phase and/or amplitude). This configuration of the third layer below the first and second layers can help isolate electrodes 502 and 506 and routing traces 504 and 508 from noise below the third layer (e.g., display circuitry that can interfere with the ability of electrodes 502 and/or 506 to detect changes in capacitance). In some examples, elongated electrodes 502 can be operated as guard electrodes (e.g., coupled to a voltage source or ground) to help isolate traces 508 from noise above the first layer. As will be described in greater detail below, in some examples, elongated electrodes 502 can be operated as self-capacitance electrodes in a self-capacitance mode (e.g., by coupling elongated electrodes 502 to sensing circuitry 314 of FIG. 3), be operated as sense and/or drive electrodes in a mutual capacitance mode (e.g., as described above with reference to FIG. 4), or be operated as guard electrodes (e.g., can be actively driven at a reference voltage (e.g., AC or DC) or can be coupled to ground or any other fixed voltage source) to reduce noise coupled to routing traces 508 (e.g., false positives or parasitic coupling). In some examples, this voltage source can be the same AC voltage source that is used to stimulate the electrodes on the second layer (e.g., at the same frequency, phase and/or amplitude). Similarly, as will be described in greater detail below, touch node electrodes 506 can be operated as self-capacitance electrodes in a self-capacitance mode (e.g., by coupling touch node electrodes 506 to sensing circuitry 314 of FIG. 3) or can be operated as sense and/or drive electrodes (e.g., by being grouped into rows and/or columns) in a mutual capacitance mode (e.g., as described above with reference to FIG. 4). In some examples, while a touch electrode is being sensed (e.g., a self-capacitance electrode or a mutual capacitance sense electrode) to determine the occurrence of a touch, other non-sensed touch electrodes can be driven with the same reference voltage (e.g., the guard signal) as the guard layer(s). In this configuration, the sensed electrodes can be surrounded by other touch electrodes that are also acting as a guard. As each electrode is sensed in turn, the guard signal can be selectively applied to other non-sensed electrodes. It should be understood throughout the examples of the disclosure that, where guarding behavior of an electrode is described, the examples are not limited to any particular mechanism (e.g., passive guarding, active guarding using a guard signal) by which the electrode exhibits such guarding behavior.

Figure 5B:
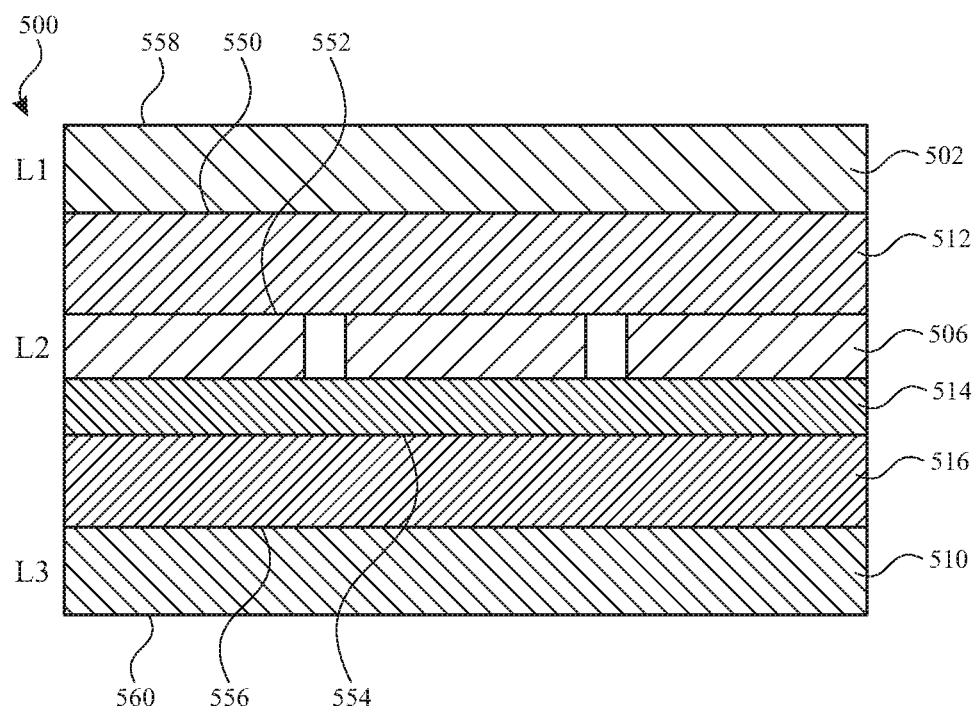

FIG. 5B illustrates a cross-sectional view of touch sensor panel 500 according to examples of the disclosure (e.g., cross section at line A-A' as illustrated in FIG. 5A). FIG. 5B illustrates a double-sided ITO (DITO) substrate 512 with ITO patterned on both sides. Specifically, elongated electrodes 502 (e.g., column or row electrodes) can be arranged (e.g., disposed) on a first side (e.g., side 550) of substrate 512 (e.g., the first layer L1), and touch node electrodes 506 can be disposed on a second side (e.g., side 552) of substrate 512 (e.g., the second layer L2). In some examples, the touch sensor panel 500 can further include a cover (e.g., a glass cover in a touch screen configuration) (not shown) disposed on touch surface 558 of touch sensor panel 500, which can be formed from glass, acrylic, sapphire, and the like. Touch sensor panel 500 can be further composed of a single-sided ITO (SITO) substrate 516 with a coat of ITO disposed on a first side (e.g., side 556) of substrate 516. Specifically, side 556 of substrate 516 can be coated with conductive material (e.g., ITO) to form a continuous guard layer 510 (e.g., the third layer L3) (e.g., as described above with reference to FIG. 5A). In some examples, side 554 of substrate 516 can be coated with adhesive 514 and adhered to the second layer L2 of touch sensor panel 500. In some examples, adhesive 514 can be an optically clear adhesive (OCA) and/or a pressure sensitive adhesive (PSA). In some examples, adhesive 514 can be an adhesive that compresses with pressure. Substrate 512 and/or 516 can be made of any transparent substrate material, such as plastic, glass, quartz, silicone, or a rigid or flexible (e.g., compressible or compliant under pressure) composite. In some examples, substrate 512 and 516 can be made of the same material. In some examples, substrate 512 and 516 can be made of different materials. For example, substrate 512 can be made of a rigid material while substrate 516 and/or adhesive 514 can be made of a flexible (e.g., compressible or compliant under pressure) material, such that the distance between touch node electrodes 506 and guard layer 510 (e.g., the distance between L1 and L3) can change (e.g., reduce) when pressure is applied to touch sensor panel 500. In another example, substrate 512 and substrate 516 and/or adhesive 514 can be made of a flexible (e.g., compressible or compliant under pressure) material, but the compression between touch node electrodes 506 and guard layer 510 (e.g., between L2 and L3) can be greater than the compression between elongated electrodes 502 and touch node electrodes 506 (e.g., between L1 and L2) when pressure is applied to touch sensor panel 500. It should be noted that while layers L1-L3 are described as being formed by ITO, these layers can be formed any other conductive material.

Figure 5C:
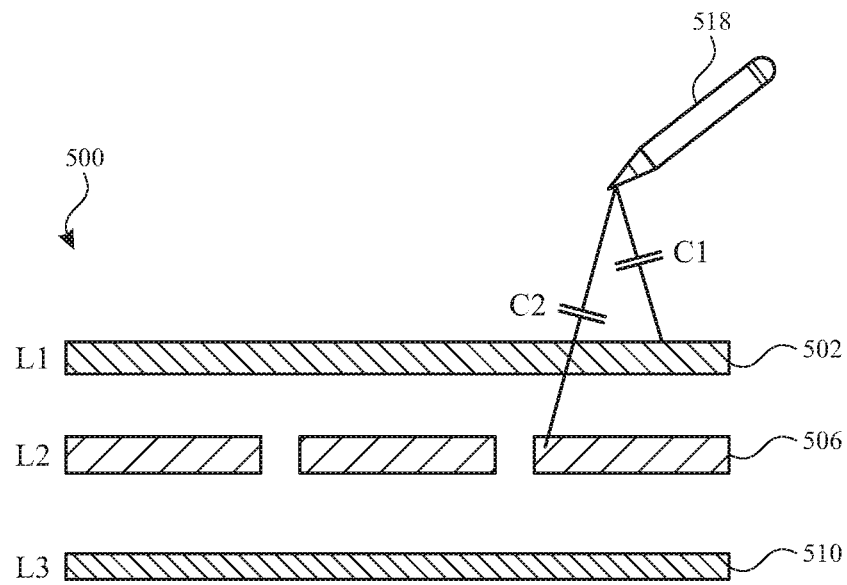

FIG. 5C illustrates the operation of touch sensor panel 500 to detect activity of an active stylus in a mutual capacitance mode according to examples of the disclosure. In particular, in some examples, touch sensor panel 500 can be configured in a stylus detection mode. During that mode, elongated electrodes 502 and/or touch node electrodes 506 can be configured to operate as sense electrodes, such as illustrated in FIG. 4. Active stylus 518 can generate stimulation signals (effectively operating as a drive electrode). During a stylus scan at touch sensor panel 500, the stimulation signals can be injected by stylus 518 into the touch sensor panel 500 and can cause mutual capacitive coupling C1 between the stylus 518 and the elongated electrodes 502 in the first layer (e.g., L1) and/or capacitive coupling C2 between the stylus 518 and one or more touch node electrodes 506 in the second layer (e.g., L2). The capacitances C1 and C2 and/or the changes in capacitances C1 and C2 can be sensed at the location of the particular elongated electrode 502 and/or at the location of the particular touch node electrode 506 by one or more touch sensing circuits for processing (e.g., as illustrated in FIG. 4). In some examples, during the stylus scan, stimulation signals are not applied to elongated electrodes 502 and/or touch node electrodes 506 apart from signals generated by the active stylus 518; rather, elongated electrodes 502 and/or touch node electrodes 506 are coupled to sense circuitry 414 in FIG. 4 for sensing stylus 518.

Figure 5D:
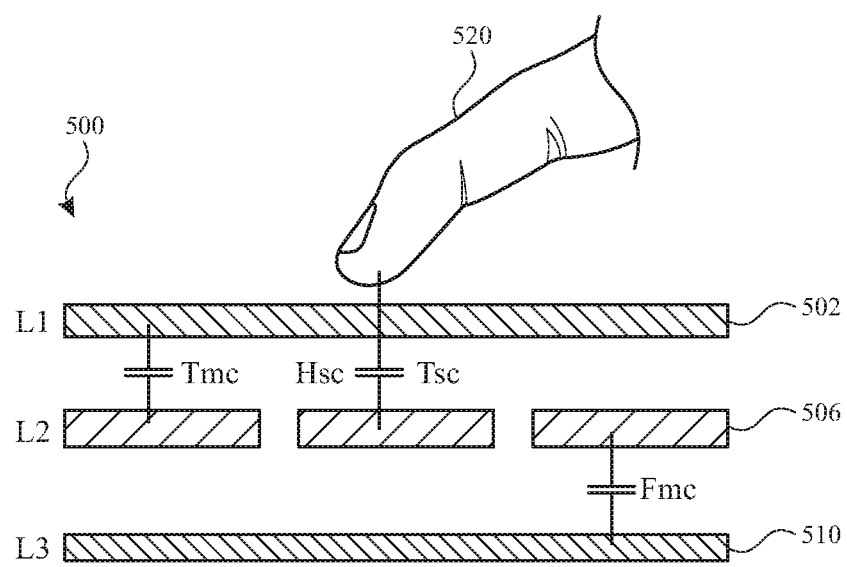

FIG. 5D illustrates the operation of touch sensor panel 500 to detect hover (proximity), touch, and/or force of an object (e.g., a finger) according to examples of the disclosure. For example, touch node electrodes 506 in the second layer (e.g., L2) of the touch sensor panel 500 can be operated as self-capacitance touch node electrodes (e.g., as described above with reference to FIG. 3) in a self-capacitance mode. While in this self-capacitance mode, capacitance coupling $H_{sc}$ (e.g., hovering event) and/or $T_{sc}$ (e.g., touch event) can occur between object 520 (e.g., finger) and self-capacitance touch node electrode 506. This capacitance coupling (e.g., $H_{sc}$ and/or $T_{sc}$) at the location of the particular touch node electrode 506 can be detected to indicate a touch or proximity event (e.g., as described above with reference to FIG. 3). Touch sensor panel 500 can also be operated in a mutual capacitance mode. For example, elongated electrodes 502 in the first layer (e.g., L1) of the touch sensor panel 500 can be operated as sense/drive electrodes and touch node electrodes 506 in the second layer (e.g., L2) of the touch sensor panel 500 can be operated as drive/sense electrodes in the mutual capacitance mode. This configuration can cause mutual capacitive coupling $T_{mc}$ between elongated electrodes 502 and touch node electrodes 506. When a finger or object 520 approaches the touch node created by an intersection of an elongated electrode 502 and a touch node electrode 506 (or a group of touch node electrodes 506), mutual capacitance $T_{mc}$ can be altered. This change in mutual capacitance $T_{mc}$ at the location of the intersection of a particular elongated electrode 502 and a particular touch node electrode 506 (or a group of touch node electrodes 506) can be detected to indicate a touch or proximity at the location of the touch node (e.g., as described above with reference to FIG. 4). In some examples, the continuous conductive material 510 in the third layer (e.g., L3) can be operated as a drive/sense layer (e.g., as described above with reference to FIG. 4), and touch node electrodes 506 in the second layer (e.g., L2) can be operated as sense/drive electrodes. For example, continuous conduct material 510 can be stimulated by a stimulation signal (e.g., an AC voltage signal). This stimulation signal can be capacitively coupled to touch node electrode 506 (or a group of touch node electrodes 506) through mutual capacitance $F_{mc}$ between conductive material 510 (e.g., drive layer) and touch node electrode(s) 506 (e.g., sense electrodes). When a finger or object 520 approaches the touch node created by the intersections of conductive material 510 (e.g., drive layer) and touch node electrodes 506, mutual capacitance $F_{mc}$ can be altered. This change in mutual capacitance $F_{mc}$ at the location of the intersection of conductive material 510 and a particular touch node electrode 506 can be detected to indicate a touch or proximity event at the location of the touch node (e.g., as described above with reference to FIG. 4). Moreover, when a pressure compliant or compressible material (e.g., a pressure sensitive adhesive (PSA), silicone, or any other material that compresses with pressure) is disposed between touch node electrodes 506 and conductive material 510 (e.g., between layers L2 and L3), the distance between conductive material 510 and individual touch node electrodes 506 can change, causing mutual capacitance $F_{mc}$ to change (e.g., as described above with reference to FIG. 5B). This change in mutual capacitance $F_{mc}$ at the location of the intersection of conductive material 510 and a particular touch node electrode 506 can be detected to indicate a force event at the touch node (e.g., as described above with reference to FIG. 4).

FIGS. 5E-5I illustrate exemplary tables describing different modes of operation for exemplary touch sensor panel configurations with three layers of electrodes according to examples of the disclosure. Specifically, the table illustrated in FIG. 5E shows the different modes in which touch sensor panel 500 can be operated. For example, FIG. 5E shows that touch sensor panel 500 can be used for stylus sensing S (e.g., as described above with reference to FIG. 5C), touch/hover sensing in a self-capacitance configuration SC (e.g., as described above with reference to FIG. 5D), touch sensing in a mutual capacitance configuration MC1-MC2 (e.g., as described above with reference to FIG. 5D), and force sensing F1-F4 (e.g., as described above with reference to FIG. 5D). For example, the table in FIG. 5E illustrates that stylus sensing mode S can be performed by operating the elongated electrodes 502 in the first layer (e.g., L1) and the touch node electrodes 506 in the second layer (e.g., L2) of touch sensor panel 500 as sense lines/electrodes (e.g., by coupling elongated electrodes 502 and touch node electrodes 506 to sensing circuitry 414 in FIG. 4) and operating the conductive material 510 in the third layer (e.g., L3) as a guard electrode (e.g., by operating the conductive material 510 at a reference voltage as previously described, such as an AC voltage having the same amplitude and/or frequency as the stimulation signal provided by the stylus).

In another example, the table in FIG. 5E illustrates that touch/hover sensing mode SC can be performed by operating elongated electrodes 502 in the first layer (e.g., L1) of touch sensor panel 500 as guard electrodes (e.g., by operating one or more elongated electrodes 502 at a reference voltage, as previously described) or as self-capacitance touch electrodes (e.g., as described above with reference to FIG. 3), operating the touch node electrodes 506 in the second layer (e.g., L2) of touch sensor panel 500 as self-capacitance touch node electrodes (e.g., as described above with reference to FIG. 3) and operating the elongated electrodes 502 in the first layer (e.g., L1) and the conductive material 510 disposed on the third layer (e.g., L3) of the touch sensor panel 500 as guard electrode (e.g., by operating the conductive material 510 at a reference voltage, as previously described).

In another example, the table in FIG. 5E illustrates that touch sensing mode MC1 can be performed by operating elongated electrodes 502 in the first layer (e.g., L1) of touch sensor panel 500 as sense lines/electrodes (e.g., coupling elongated electrodes 502 to sensing circuitry 414 of FIG. 4), operating touch node electrodes 506 in the second layer (e.g., L2) of touch sensor panel 500 as drive lines/electrodes (e.g., coupling touch node electrodes 506 to stimulation signal 406 of FIG. 4), and operating the conductive material 510 in the third layer (e.g., L3) as a guard electrode (e.g., by operating the conductive material 510 at a reference voltage as previously described). In another example, the table in FIG. 5E illustrates that touch sensing mode MC2 can be performed by operating elongated electrodes 502 in the first layer (e.g., L1) of touch sensor panel 500 as drive lines/electrodes (e.g., coupling elongated electrodes 502 to stimulation signal 406 of FIG. 4), operating touch node electrodes 506 in the second layer (e.g., L2) of touch sensor panel 500 as sense lines/electrodes (e.g., coupling elongated electrodes 506 to sensing circuitry 414 of FIG. 4), and operating the conductive material 510 in the third layer (e.g., L3) as a guard electrode (e.g., by operating the conductive material 510 at a reference voltage as previously described).

In another example, the table in FIG. 5E illustrates that force sensing mode F1 can be performed by operating elongated electrodes 502 in the first layer (e.g., L1) of touch sensor panel 500 as sense lines/electrodes (e.g., coupling elongated electrodes 502 to sensing circuitry 414 of FIG. 4) and the conductive material 510 in the third layer (e.g., L3) of touch sensor panel 500 as a drive electrode (e.g., coupling conductive material 510 to stimulation signal 406 of FIG. 4). In some examples, touch node electrodes 506 in the second layer (e.g., L2) of touch sensor panel 500 can be operated as sense electrodes (e.g., as described above with reference to FIG. 4), drive electrodes (e.g., as described above with reference to FIG. 4), self-capacitance touch node electrodes (e.g., as described above with reference to FIG. 3), or driven at a reference voltage (e.g., an AC signal having the same amplitude and/or frequency as the AC signal used to drive the conductive material 510 in the third layer L3), or can be tired to ground, or left floating during the force sensing mode F1. In another example, the table in FIG. 5E illustrates that force sensing mode F2 can be performed by operating elongated electrodes 502 in the first layer (e.g., L1) of touch sensor panel 500 as drive lines/electrodes (e.g., coupling elongated electrodes 502 to stimulation signal 406 of FIG. 4) and the conductive material 510 in the third layer (e.g., L3) of touch sensor panel 500 as a sense electrode (e.g., coupling conductive material 510 to sensing circuitry 414 of FIG. 4). In some examples, touch node electrodes 506 in the second layer (e.g., L2) of touch sensor panel 500 can be operated as sense lines/electrodes (e.g., as described above with reference to FIG. 4), drive electrodes (e.g., as described above with reference to FIG. 4), self-capacitance touch node electrodes (e.g., as described above with reference to FIG. 3), or driven at a reference voltage (e.g., an AC signal having the same amplitude and/or frequency as the AC signal used to drive the conductive material 510 in the third layer L3), or can be tied to ground, or left floating during the force sensing mode F2. In another example, the table in FIG. 5E illustrates that force sensing mode F3 can be performed by operating touch node electrodes 506 in the second layer (e.g., L2) of touch sensor panel 500 as sense lines/electrodes (e.g., coupling touch node electrodes 506 to sensing circuitry 414 of FIG. 4) and the conductive material 510 in the third layer (e.g., L3) of touch sensor panel 500 as a drive electrode (e.g., coupling conductive material 510 to stimulation signal 406 of FIG. 4). In some examples, elongated electrodes 502 in the first layer (e.g., L1) of touch sensor panel 500 can be operated as sense electrodes (e.g., as described above with reference to FIG. 4), drive electrodes (e.g., as described above with reference to FIG. 4), self-capacitance touch node electrodes (e.g., as described above with reference to FIG. 3), or driven at a reference voltage (e.g., an AC signal having the same amplitude and/or frequency as the AC signal used to drive the conductive material 510 in the third layer L3), or can be tied to ground, or left floating during the force sensing mode F3. In another example, the table in FIG. 5E illustrates that force sensing mode F4 can be performed by operating touch node electrodes 506 in the second layer (e.g., L2) of touch sensor panel 500 as drive lines/electrodes (e.g., coupling touch node electrodes 506 to stimulation signal 406 of FIG. 4) and the conductive material 510 in the third layer (e.g., L3) of touch sensor panel 500 as a sense electrode (e.g., coupling conductive material 510 to sensing circuitry 414 of FIG. 4). In some examples, elongated electrodes 502 in the first layer (e.g., L1) of touch sensor panel 500 can be operated as sense lines/electrodes (e.g., as described above with reference to FIG. 4), drive electrodes (e.g., as described above with reference to FIG. 4), self-capacitance touch node electrodes (e.g., as described above with reference to FIG. 3), or driven at a reference voltage (e.g., an AC signal having the same amplitude and/or frequency as the AC signal used to drive the conductive material 510 in the third layer L3), or can be tied to ground, or left floating during the force sensing mode F4.

FIG. 5F illustrates a table showing additional details about stylus sensing mode S that can be performed using the touch sensor panel of the disclosure. For example, FIG. 5F illustrates that stylus sensing mode S-A can be performed by operating the elongated electrodes 502 in the first layer (e.g., L1) as sense lines/electrodes (e.g., by coupling elongated electrodes 502 to sensing circuitry 414 of FIG. 4), operating at least one of the touch node electrodes 506 in the second layer (e.g., L2) of touch sensor panel 500 as sense line(s)/electrode(s) (e.g., by coupling at least one of the touch node electrodes 506 to sensing circuitry 414 of FIG. 4) while coupling the remaining touch node electrodes 506 to a voltage source (e.g., operate them as guard) and/or ground, and operating the conductive material 510 in the third layer (e.g., L3) as a guard electrode. It should be understood that the electrodes operating as sense lines/electrodes need not be sensed at the same time (e.g., can be sensed sequentially). In another example, FIG. 5F illustrates that stylus sensing mode S-B can be performed by operating the elongated electrodes 502 in the first layer (e.g., L1) as sense lines/electrodes, operating at least one row/column of touch node electrodes 506 (e.g., grouping touch node electrodes 506 to form a row or a column) in the second layer (e.g., L2) of touch sensor panel 500 as sense line(s)/electrode(s) while coupling the remaining touch node electrodes 506 to a voltage source (e.g., operate them as guard) and/or ground, and operating the conductive material 510 in the third layer (e.g., L3) of the touch sensor panel 500 as a guard electrode. It should be understood that the row(s)/column(s) of touch node electrodes 506 operating as sense lines/electrodes need not be sensed at the same time (e.g., can be sensed sequentially). In another example, FIG. 5F illustrates that stylus sensing mode S-C can be performed by operating the elongated electrodes 502 in the first layer (e.g., L1) as sense lines/electrodes, operating all rows/columns of touch node electrodes 506 (e.g., grouping touch node electrodes to form rows or columns) in the second layer (e.g., L2) of touch sensor panel 500 as sense lines/electrodes, and operating the conductive material 510 in the third layer (e.g., L3) as a guard electrode (e.g., by operating the conductive material 510 at a reference voltage as previously described).

FIG. 5G illustrates a table showing additional touch panel configurations in which touch/hover sensing mode SC can be performed. For example, FIG. 5G illustrates that touch/hover sensing mode SC-A can be performed by operating all of the touch node electrodes 506 in the second layer (e.g., L2) of touch sensor panel 500 as self-capacitance touch node electrodes (e.g., as described above with reference to FIG. 3) and operating the elongated electrodes 502 in the first layer (e.g., L1) and the conductive material disposed 510 on the third layer (e.g., L3) of the touch sensor panel 500 as guard (e.g., by operating the elongated electrodes 502 and the conductive material 510 at a reference voltage as previously described). In another example, FIG. 5G illustrates that touch/hover sensing mode SC-B can be performed by operating a subset of the touch node electrodes 506 (e.g., a group, a row, a column, etc.) in the second layer (e.g., L2) of touch sensor panel 500 as self-capacitance touch node electrodes (e.g., as described above with reference to FIG. 3) while coupling the remaining touch node electrodes 506 to a voltage source (e.g., operate them as guard), and operating the elongated electrodes 502 in the first layer (e.g., L1) and the conductive material disposed on the third layer (e.g., L3) of the touch sensor panel 500 as guard. For example, in a 3×3 touch node electrode configuration, the subset of the touch node electrodes 506 operated as self-capacitance touch node electrodes can be the first row of the 3×3 touch node electrode configuration and the remaining touch node electrodes 506 in the second and third rows of the 3×3 touch node electrode configuration can be coupled to a voltage source (e.g., operated as guard). In another example, FIG. 5G illustrates that touch/hover sensing mode SC-C can be performed by operating a subset of the touch node electrodes 506 (e.g., a group, a row, a column, etc.) in the second layer (e.g., L2) of touch sensor panel 500 as self-capacitance touch node electrodes (e.g., as described above with reference to FIG. 3) while coupling the remaining touch node electrodes 506 to ground, and operating the elongated electrodes 502 in the first layer (e.g., L1) and the conductive material disposed on the third layer (e.g., L3) of the touch sensor panel 500 as guard (e.g., by operating the elongated electrodes 502 and the conductive material 510 at a reference voltage as previously described). For example, in a 3×3 touch node electrode configuration, the subset of the touch node electrodes 506 operated as self-capacitance touch node electrodes can be the second row of the 3×3 touch node electrode configuration and the remaining touch node electrodes 506 in the first and third rows of the 3×3 touch node electrode configuration can be coupled to ground. In another example, FIG. 5G illustrates that touch/hover sensing mode SC-D can be performed by operating a first subset of touch node electrodes 506 (e.g., a group, a row, a column, etc.) in the second layer (e.g., L2) of touch sensor panel 500 as self-capacitance touch node electrodes (e.g., as described above with reference to FIG. 3), operating a second subset of touch node electrodes 506 (e.g., a group, a row, a column, etc.) in the second layer (e.g., L2) of touch sensor panel 500 as guards, coupling the remaining touch node electrodes 506 in the second layer of touch sensor panel 500 to ground, and operating the elongated electrodes 502 in the first layer (e.g., L1) and the conductive material disposed on the third layer (e.g., L3) of the touch sensor panel 500 as guard (e.g., by operating the elongated electrodes 502 and the conductive material 510 at a reference voltage as previously described). For example, in a 3×3 touch node electrode configuration, the first row of touch node electrodes 506 in the 3×3 touch node electrode configuration can be operated as self-capacitance touch node electrodes, the second row of touch node electrodes 506 in the 3×3 touch node electrode configuration can be coupled to a voltage source (e.g., operated as guard), and the third row of touch node electrodes 506 in the 3×3 touch node electrode configuration can be coupled to ground. It should be understood that while the elongated electrodes 502 in the first layer (e.g., L1) of the touch sensor panel 500 are illustrated as being operated as guard in FIG. 5G, in some examples, one or more elongated electrodes 502 can be operated as self-capacitance touch electrodes (e.g., as described above with reference to FIG. 3) during any of the described touch/hover sensing mode SC of FIG. 5G.

FIG. 5H illustrates a table showing additional details about touch sensing mode MC1 that can be performed using the touch sensor panel of the disclosure. For example, FIG. 5H illustrates that touch sensing mode MC1-A can be performed by operating elongated electrodes 502 in the first layer (e.g., L1) of touch sensor panel 500 as sense lines/electrodes (e.g., by coupling elongated electrodes 502 to sensing circuitry 414 of FIG. 4), operating at least one touch node electrode 506 in the second layer (e.g., L2) of touch sensor panel 500 as drive line(s)/electrode(s) (e.g., by coupling at least one of the touch node electrodes 506 to stimulation signal 406 of FIG. 4) while coupling the remaining touch node electrodes 506 to a voltage source (e.g., operate them as guard) and/or ground, and operating the conductive material 510 in the third layer (e.g., L3) as a guard layer (e.g., as described above with reference to FIGS. 4 and 5D). In another example, FIG. 5H illustrates that touch sensing mode MC1-B can be performed by operating elongated electrodes 502 in the first layer (e.g., L1) of touch sensor panel 500 as sense lines/electrodes (e.g., by coupling elongated electrodes 502 to sensing circuitry 414 of FIG. 4), operating at least one row or column of touch node electrodes 506 (e.g., by grouping touch node electrodes to form rows or columns) in the second layer (e.g., L2) of touch sensor panel as drive line(s)/electrode(s) (e.g., by coupling at least one row or column of the touch node electrodes 506 to stimulation signal 406 of FIG. 4) while coupling the remaining touch node electrodes 506 to a voltage source (e.g., operate them as guard) and/or ground, and operating the conductive material 510 in the third layer (e.g., L3) as a guard layer (e.g., as described above with reference to FIGS. 4 and 5D). For example, in a 3×3 touch node electrode configuration, the first row of touch node electrodes 506 in the 3×3 touch node electrode configuration can be operated as a drive electrode (e.g., by coupling the first row of touch node electrodes 506 to stimulation signal 406 of FIG. 4) and the remaining touch node electrodes 506 in the second and third rows of the 3×3 touch node electrode configuration can be coupled to a voltage source (e.g., operated as guard) and/or ground. In another example, FIG. 5H illustrates that touch sensing mode MC1-C can be performed by operating elongated electrodes 502 in the first layer (e.g., L1) of touch sensor panel 500 as sense electrodes (e.g., by coupling elongated electrodes 502 to sensing circuitry 414 of FIG. 4), operating all rows or columns of touch node electrodes 506 (e.g., by grouping touch node electrodes to form rows or columns) in the second layer (e.g., L2) of touch sensor panel as a drive electrodes, and operating the conductive material 510 in the third layer (e.g., L3) as a guard layer (e.g., as described above with reference to FIGS. 4 and 5D).

FIG. 5I illustrates a table showing additional details about touch sensing mode MC2 that can be performed using the touch sensor panel of the disclosure. For example, FIG. 5I illustrates that touch sensing mode MC2-A can be performed operating elongated electrodes 502 in the first layer (e.g., L1) of touch sensor panel 500 as drive electrodes (e.g., by coupling elongated electrodes 502 to stimulation signal 406 of FIG. 4), operating at least one touch node electrode 506 in the second layer (e.g., L2) of touch sensor panel 500 as a sense line/electrode (e.g., by coupling at least one touch node electrode 506 to sensing circuitry 414 of FIG. 4), and operating the conductive material 510 in the third layer (e.g., L3) as a guard layer (e.g., as described above with reference to FIGS. 4 and 5D). In another example, FIG. 5H illustrates that touch sensing mode MC2-B can be performed by operating elongated electrodes 502 in the first layer (e.g., L1) of touch sensor panel 500 as drive electrodes (e.g., by coupling elongated electrodes 502 to stimulation signal 406 of FIG. 4), operating at least one row or column of touch node electrodes 506 (e.g., by grouping touch node electrodes to form rows or columns) in the second layer (e.g., L2) of touch sensor panel 500 as sense line(s)/electrode(s) (e.g., by coupling at least one row or column of touch node electrodes 506 to sensing circuitry 414 of FIG. 4) while coupling the remaining touch node electrodes 506 to a voltage source (e.g., operate them as guard) and/or ground, and operating the conductive material 510 in the third layer (e.g., L3) as a guard electrode (e.g., by operating the conductive material 510 at a reference voltage as previously described). For example, in a 3×3 touch node electrode configuration, the first row of touch node electrodes 506 in the 3×3 touch node electrode configuration can be operated as a sense electrode (e.g., by coupling the first row of touch node electrodes 506 to sensing circuitry 414 of FIG. 4) and the remaining touch node electrodes 506 in the second and third rows of the 3×3 touch node electrode configuration can be coupled to a voltage source (e.g., operated as guard) and/or ground. In another example, FIG. 5H illustrates that touch sensing mode MC2-C can be performed by operating elongated electrodes 502 in the first layer (e.g., L1) of touch sensor panel 500 as drive electrodes (e.g., by coupling elongated electrodes 502 to stimulation signal 406 of FIG. 4), operating all rows or columns of touch node electrodes 506 (e.g., by grouping touch node electrodes to form rows or columns) in the second layer (e.g., L2) of touch sensor panel 500 as a sense electrodes (e.g., by coupling all rows or columns of touch node electrodes 506 to sensing circuitry 414 of FIG. 4), and operating the conductive material 510 in the third layer (e.g., L3) as a guard layer (e.g., as described above with reference to FIGS. 4 and 5D).

Figure 5J:
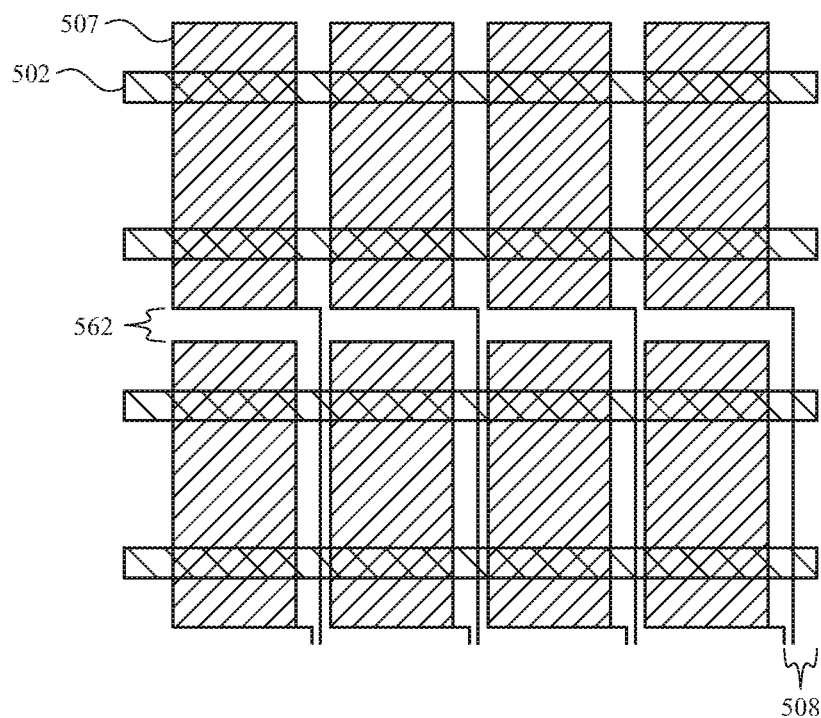
FIGS. 5J-5M illustrate additional exemplary touch sensor panel configurations according to examples of the disclosure.

FIGS. 5J-5M illustrate additional exemplary touch sensor panel configurations according to examples of the disclosure. For example, FIG. 5J illustrates a touch sensor panel configuration similar to the configuration shown in FIG. 5A, and can include a plurality of elongated electrodes 502 arranged along a first direction (e.g., horizontal direction) on a first layer (e.g., creating rows with multiple electrodes), a plurality of elongated electrodes 507 (with an aspect ratio higher than touch node electrodes 506 of FIG. 5A but lower than the plurality of elongated electrodes 502) with corresponding traces 508 arranged along a second direction (e.g., a vertical direction) across and under the plurality of elongated electrodes 502 on a second layer, different from the first layer, and without showing routing traces 504 for simplicity. In some examples, routing traces 504 can be coupled to elongated electrodes 502 at the left and/or right end of each elongated electrodes 502 and routed to drive and/or sensing circuitry (e.g., as described above with reference to FIGS. 3-4) in any direction (e.g., routing up, down, left, right). While FIG. 5J illustrates two elongated electrodes 502 arranged across each elongated electrode 507, it should be understood that less (e.g., none or one) or more (e.g., three, four) elongated electrode(s) 502 can be arranged across elongated electrodes 507. In some examples, additional layers can be included (e.g., any of the layers described above with reference to FIGS. 5A-5I (e.g., a third layer below the first and second layers comprising a continuous conductive material (e.g., ITO)), any of the layers described below with reference to FIGS. 6-7). It should be understood that the touch sensor configurations shown in FIG. 5I can be used to perform any of the modes of operation described in this disclosure (e.g., the plurality of elongated electrodes 502 can correspond to the electrodes on the first layer (e.g., L1) and the plurality of elongated electrodes 507 can correspond to the electrodes on the second layer (e.g., L2) and with additional third and/or fourth layers as described with reference to FIGS. 5A-5I and FIGS. 6-7). It should also be understood that each elongated electrode 502 or 507 can be separately addressable when performing self-capacitance and/or mutual capacitance sensing of those electrodes (e.g., as described above with reference to FIGS. 3-4). For example, during a mutual capacitance mode, electrodes 507 can be driven with a drive signal (e.g., all electrodes 507 in a column, though separately addressable, can be driven with the same drive signal; or, in some embodiments, different electrodes in a given column can be driven with different drive signals), and electrodes 502 can be sensed. As another example, during a self-capacitance mode, electrodes 502 can be individually sensed for self-capacitance (e.g., using different sensing circuitry for each, or sensing each sequentially using the same sensing circuitry), and electrodes 507 can also be individually sensed for self-capacitance (e.g., using different sensing circuitry for each, or sensing each sequentially using the same sensing circuitry). Other sensing configurations as described with reference to FIGS. 5E-5I can additionally or alternatively be implemented in the configuration of FIG. 5I, as described above.

Figure 5K:
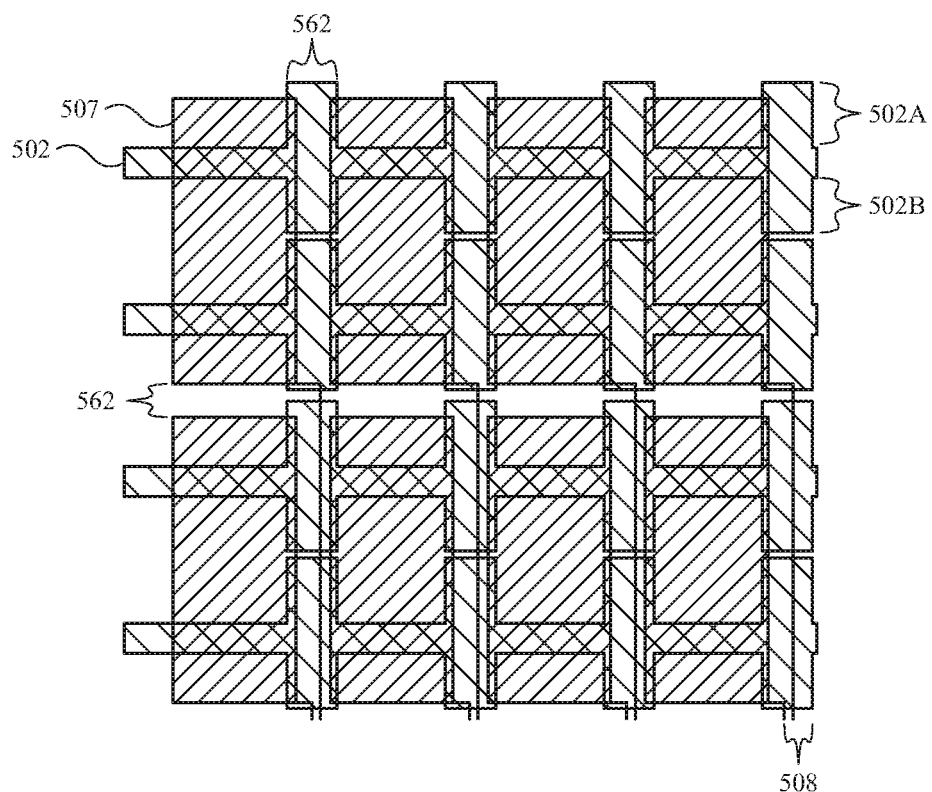

FIG. 5K illustrates a touch sensor panel configuration similar to the configuration shown in FIG. 5I, but with segments of elongated electrodes 502 extending along the second direction (e.g., the vertical direction) on the first layer over (or partially over) gaps 562 in that second direction. For example, row electrodes 502 can extend up over (or substantially over) gaps 562 (e.g., as shown by segments 502A in FIG. 5K) and extend down over (or substantially over) gaps 562 (e.g., as shown by segment 502B in FIG. 5K). In some examples, the lengths and/or shapes of segments 502A and 502B are the same (or substantially the same). In some examples, the lengths and/or shapes of segments 502A and 502B vary. It should be understood that the segments 502A and 502B can come close to without touching other electrodes on that same first layer (e.g., other elongated electrodes 502 (including segments 502A and/or 502B)). In this way, the touch sensor panel configuration shown in FIG. 5K can improve optical uniformity. This configuration can also reduce noise coupling to routing traces 508 for electrodes 507 (e.g., when row electrodes 502 are operated as guard electrodes, such as actively driven at a reference voltage (e.g., AC or DC) or coupled to ground or any other fixed voltage source as described above). Thus, electrodes 502 including segments 502A and 502B can be configured to shield traces 508 from above, in addition to being configured for use in touch sensing operations described with reference to FIGS. 5A-5I. In some examples, segments 502A and/or 502B can partially overlap touch electrodes 507 (e.g., as shown in FIG. 5K). The remaining details of FIG. 5K can be the same as those of FIG. 5J. It should be understood that the touch sensor configuration shown in FIG. 5K can be used to perform any of the modes of operation described in this disclosure, including those described with reference to FIGS. 5A-5I (e.g., the plurality of elongated electrodes 502 can correspond to the electrodes on the first layer (e.g., L1) and the plurality of elongated electrodes 507 can correspond to the electrodes on the second layer (e.g., L2) and with additional third and/or fourth layers as described with reference to FIGS. 5A-5I and FIGS. 6-7). It should also be understood that each elongated electrode 502 or 507 can be separately addressable when performing self-capacitance and/or mutual capacitance sensing of those electrodes (e.g., as described above with reference to FIGS. 3-4).

Figure 5L:
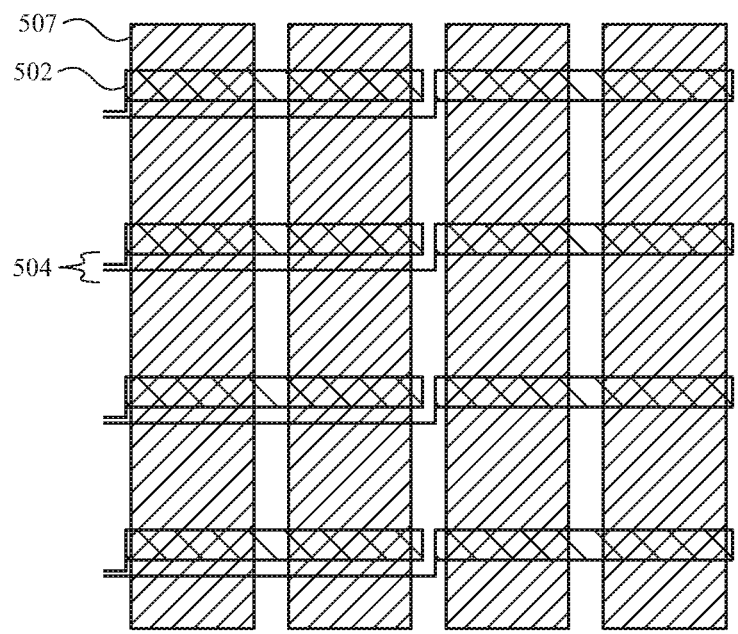

FIG. 5L illustrates a touch sensor panel configuration similar to the configuration shown in FIG. 5J, but with a plurality of elongated electrodes 502 with corresponding traces 504 arranged along a first direction (e.g., horizontal direction) on a first layer (e.g., creating rows with multiple electrodes), and elongated electrodes 507 (with a relatively higher aspect ratio than in FIG. 5J) arranged along a second direction (e.g., a vertical direction) on a second layer, different from the first layer. In some examples, each elongated electrode 502 can be arranged across and over one or more elongated electrodes 507 (e.g., as shown in FIG. 5L). While FIG. 5L illustrates elongated electrodes 502 arranged across two elongated electrodes 507, it should be understood that each elongated electrode 502 can be arranged across less (e.g., none or one) or more (e.g., three or more) elongated electrodes 507. It should be understood that the touch sensor panel configuration shown in FIG. 5L can be used to perform any of the modes of operation described in this disclosure, including those described with reference to FIGS. 5A-5I (e.g., the plurality of elongated electrodes 502 can correspond to the electrodes on the first layer (e.g., L1) and the plurality of elongated electrodes 507 can correspond to the electrodes on the second layer (e.g., L2) and with additional third and/or fourth layers as described with reference to FIGS. 5A-5I and FIGS. 6-7). It should also be understood that each elongated electrode 502 or 507 can be separately addressable when performing self-capacitance and/or mutual capacitance sensing of those electrodes (e.g., as described above with reference to FIGS. 3-4). For example, during a mutual capacitance mode, electrodes 507 can be driven with a drive signal, and electrodes 502 can be sensed (e.g., all electrodes 502 in a given row, though separately addressable, can be sensed with the same sense circuitry; or, in some embodiments, different electrodes in a given row can be sensed with different sense circuitry). As another example, during a self-capacitance mode, electrodes 502 can be individually sensed for self-capacitance (e.g., using different sensing circuitry for each, or sensing each sequentially using the same sensing circuitry), and electrodes 507 can also be individually sensed for self-capacitance (e.g., using different sensing circuitry for each, or sensing each sequentially using the same sensing circuitry). Other sensing configurations as described with reference to FIGS. 5E-5I can additionally or alternatively be implemented in the configuration of FIG. 5L, as described above.

Figure 5M:
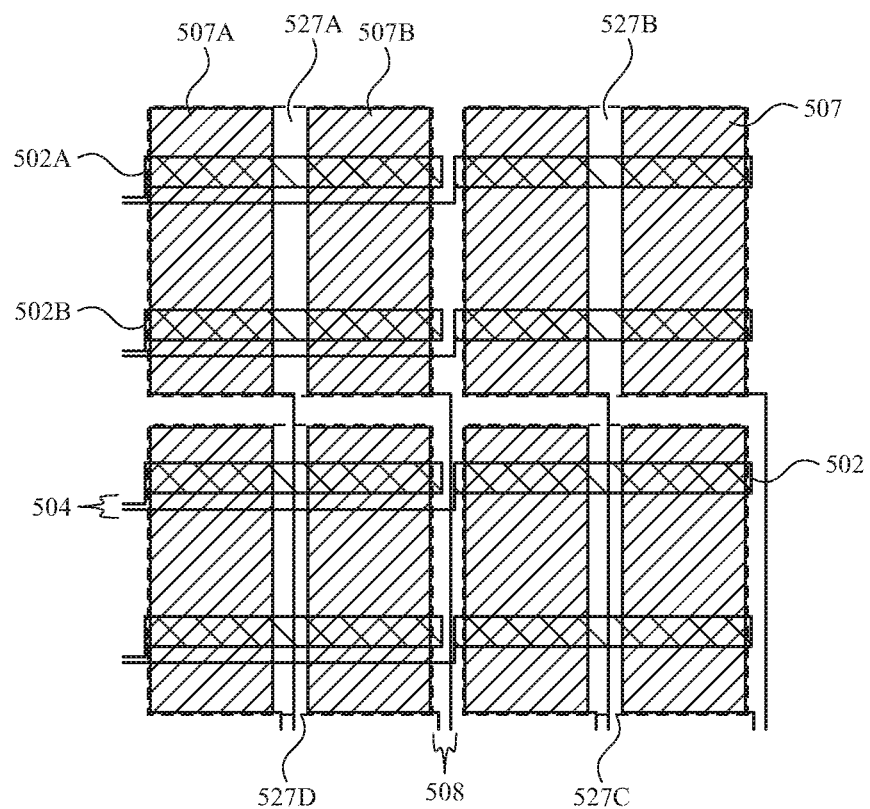

FIG. 5M illustrates a touch sensor panel configuration similar to the configuration shown in FIG. 5L, but with a plurality of elongated electrodes 502 with corresponding traces 504 arranged along a first direction (e.g., horizontal direction) on a first layer (e.g., creating rows with multiple electrodes), such as described with reference to FIG. 5L, and with a plurality of elongated electrodes 507 extending along a second direction (e.g., a vertical direction) on a second layer, different from the first layer (e.g., creating columns with multiple electrodes), such as described above with reference to FIG. 5J. In some example, two or more elongated electrodes 507 and two or more elongated electrodes 502 can be disposed together to form super nodes 527. For example, FIG. 5M illustrates super nodes 527A-527D each formed by two elongated electrodes 502 overlapping two elongated electrodes 507 (e.g., super node 527A is formed by elongated electrodes 502A, 502B, 507A, and 507B). It should be understood that the touch sensor configuration shown in FIG. 5M can be used to perform any of the modes of operation described in this disclosure, including those described with reference to FIGS. 5A-5I (e.g., the plurality of elongated electrodes 502 can correspond to the electrodes on the first layer (e.g., L1) and the plurality of elongated electrodes 507 can correspond to the electrodes on the second layer (e.g., L2) and with additional third and/or fourth layers as described with reference to FIGS. 5A-5I and FIGS. 6-7). For example, during a mutual capacitance mode, electrodes 507 can be driven with a drive signal (e.g., all electrodes 507 in a column, though separately addressable, can be driven with the same drive signal; or, in some embodiments, different electrodes in a given column can be driven with different drive signals), and electrodes 502 can be sensed (e.g., all electrodes 502 in a given row, though separately addressable, can be sensed with the same sense circuitry; or, in some embodiments, different electrodes in a given row can be sensed with different sense circuitry). As another example, during a self-capacitance mode, electrodes 502 can be individually sensed for self-capacitance (e.g., using different sensing circuitry for each, or sensing each sequentially using the same sensing circuitry), and electrodes 507 can also be individually sensed for self-capacitance (e.g., using different sensing circuitry for each, or sensing each sequentially using the same sensing circuitry). It should also be understood that each super node 527 can be used to perform any of the modes of operation described in this disclosure within each super node 527 (e.g., elongated electrodes 502A and 502B can correspond to the electrodes on the first layer (e.g., L1) and elongated electrodes 507A and 507B can correspond to the electrodes on the second layer (e.g., L2) and with additional third and/or fourth layers as described with reference to FIGS. 5A-5I and FIGS. 6-7). It should also be understood that each super node 527 can perform a different mode of operation or each super node can perform the same mode of operation (e.g., each of super nodes 527A-527D can concurrently perform a different mode of operation of FIGS. 5E-5I, the same mode of operation of FIGS. 5E-5I, or a combination thereof (e.g., a subset of super nodes performed the same mode of operation while the other super nodes perform different modes of operation)). It should also be understood that each elongated electrode 502 or 507 can be separately addressable when performing self-capacitance and/or mutual capacitance sensing of those electrodes (e.g., as described above with reference to FIGS. 3-4). In some examples, each super node can be sensed sequentially or simultaneously.

Figure 6A:
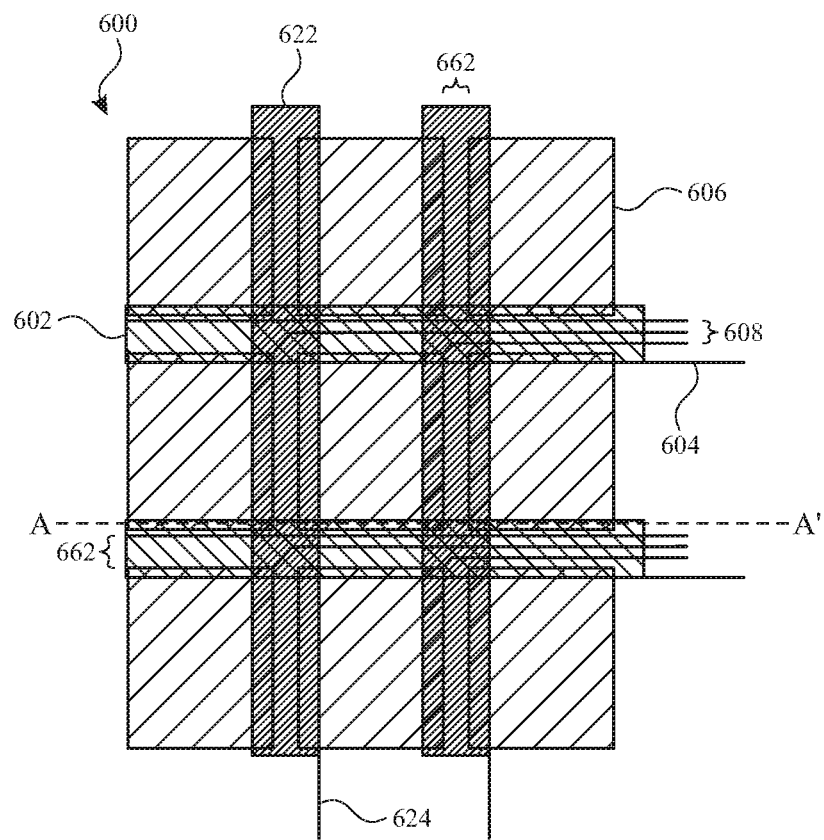
FIGS. 6A-6D illustrate exemplary touch sensor panel configurations with four layers of electrodes according to examples of the disclosure.
Figure 6B:
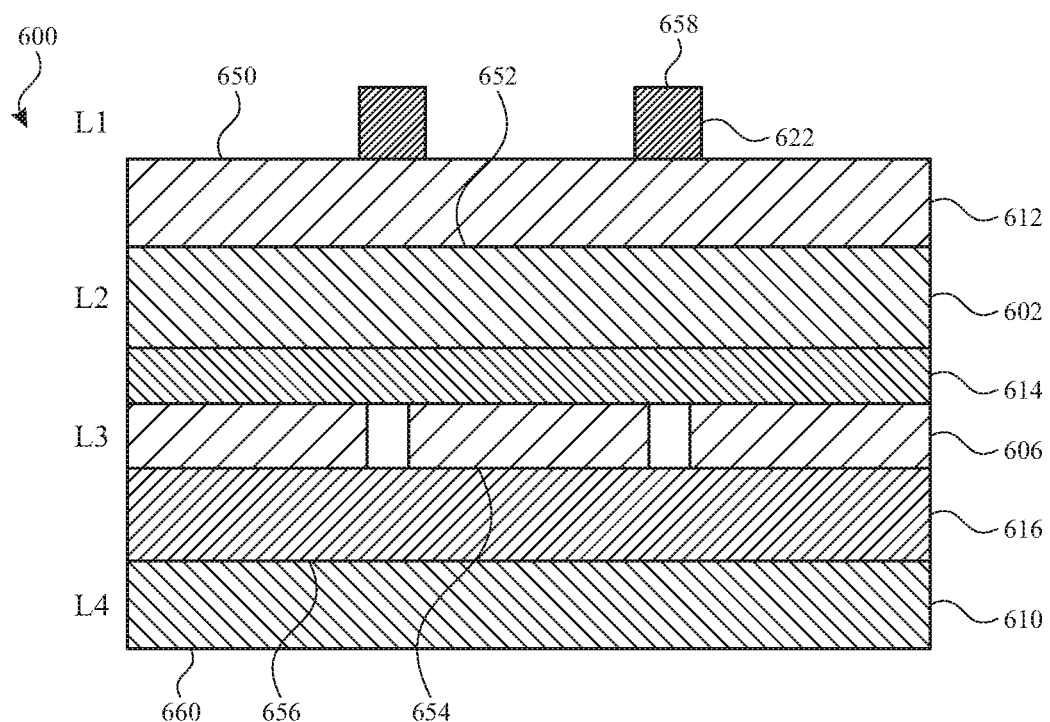

FIGS. 6A-6D illustrate exemplary touch sensor panel configurations with four layers of electrodes according to examples of the disclosure. Specifically, touch sensor panel 600 of FIG. 6A illustrates elongated electrodes 602 with corresponding traces 604 along a first direction on a first layer (e.g., in a row configuration), elongated electrodes 622 with corresponding traces 624 along a second direction, different than the first direction (e.g., in a column configuration), on a second layer, different from the first layer, and touch node electrodes 606 and corresponding traces 608 on a third layer, different from the first and second layers. In some examples, touch node electrodes 606 can be disposed with gaps 662 in between rows and/or columns of touch node electrodes 606. Corresponding traces 608 can be disposed in the gaps 662 between rows (or columns) of touch node electrodes 606 (e.g., as shown in FIG. 6A). In some examples, traces 608 can be disposed in the same first direction as elongated electrodes 604. In some examples, elongated electrodes 602 can be disposed over the gaps 662 between rows of touch node electrodes 606 (e.g., closer to the touch surface of touch screen 600 where an object touches the touch screen) such that elongated electrodes 602 completely overlap routing traces 608 of touch node electrodes 606 and, in some examples, partially overlap touch node electrodes 606 (e.g., as shown in FIG. 6A). In some examples, touch node electrodes 606 can be disposed with gaps 662 in between columns of touch node electrodes 606. Corresponding traces 608 can be disposed in the gaps 662 between columns of touch node electrodes 606 (e.g., as shown in FIG. 6A). In some examples, traces 608 can be disposed in the same first direction as elongated electrodes 622. In some examples, elongated electrodes 622 can be disposed over the gaps 662 between columns of touch node electrodes 606 (e.g., closer to the touch surface of touch screen 600 where an object touches the touch screen) such that elongated electrodes 602 completely overlap routing traces 608 of touch node electrodes 606 and, in some examples, partially overlap touch node electrodes 606. In some examples, touch sensor panel 500 can include a fourth layer below the first, second, and third layers comprising of continuous conductive material (e.g., ITO) that can be electrically coupled to a voltage source (e.g., can be driven by a voltage source to form a shield) or ground to act as a guard layer (as shown in FIG. 6B). In some examples, this voltage source can be the same AC voltage source that is used to stimulate the electrodes on the first, second, and third layers (e.g., at the same frequency, phase and/or amplitude). This configuration of the fourth layer below the first, second, and third layers can help isolate electrodes 602, 606, 622, and routing traces 604, 608, and 624 from noise below the fourth layer (e.g., display circuitry that can interfere with the ability of electrodes 602, 606, and/or 622 to detect changes in capacitance). In some examples, elongated electrodes 602 and/or 622 can be operated as guard electrodes (e.g., coupled to a voltage source or ground) to help isolate traces 608 from noise above the first layer. As will be described in greater detail below, in some examples, elongated electrodes 602 and/or 622 can be operated as self-capacitance electrodes in a self-capacitance mode (e.g., as described above with reference to FIG. 3), be operated as sense and/or drive electrodes in a mutual capacitance mode (e.g., as described above with reference to FIG. 4), or be operated as guard electrodes (e.g., can be actively driven at a reference voltage (e.g., AC or DC) or can be coupled to ground or any other fixed voltage source) to reduce noise coupled to routing traces 608 (e.g., false positives or parasitic coupling). In some examples, this voltage source can be the same AC voltage source that is used to stimulate the electrodes on the third layer (e.g., at the same frequency, phase and/or amplitude). Similarly, touch node electrodes 606 can be operated as self-capacitance electrodes in a self-capacitance mode (e.g., as described above with reference to FIG. 3) or can be operated as sense and/or drive electrodes (e.g., by being grouped in lines) in a mutual capacitance mode (e.g., as described above with reference to FIG. 4). In some examples, while a touch electrode is being sensed (e.g., a self-capacitance electrode or a mutual capacitance sense electrode) to determine the occurrence of a touch, other non-sensed touch electrodes can be driven with the same reference voltage (e.g., the guard signal) as the guard layer(s). In this configuration, the sensed electrodes can be surrounded by other touch electrodes that are also acting as a guard. As each electrode is sensed in turn, the guard signal can be selectively applied to other non-sensed electrodes. It should be understood throughout the examples of the disclosure that, where guarding behavior of an electrode is described, the examples are not limited to any particular mechanism (e.g., passive guarding, active guarding using a guard signal) by which the electrode exhibits such guarding behavior.

FIG. 6B illustrates a cross-sectional view of touch sensor panel 600 according to examples of the disclosure (e.g., cross-section at line A-A' as illustrated in FIG. 6A). FIG. 6B illustrates a first double-sided ITO (DITO) substrate 612 with ITO patterned on both sides. Specifically, elongated electrodes 622 can be arranged (e.g., disposed) on a first side (e.g., side 650) of substrate 612 (e.g., the first layer L1) in a row/column configuration and elongated electrodes 602 can be arranged (e.g., disposed) on a second side (e.g., side 652) of substrate 612 (e.g., the second layer L2) in a column/row configuration. In some examples, the touch sensor panel 600 can further include a cover (e.g., a glass cover in a touch screen configuration) (not shown) disposed on touch surface 658 of touch sensor panel 600, which can be formed from glass, acrylic, sapphire, and the like. Touch sensor panel 600 can be further composed of a second double-sided ITO (DITO) substrate 616 with touch node electrodes 606 disposed on a first side (e.g., side 654) of substrate 616 (e.g., the third layer L3) and a coat of ITO disposed on a second side (e.g., side 656). Specifically, side 656 of substrate 616 can be coated with conductive material (e.g., ITO) to form a continuous guard layer 610 (e.g., the fourth layer L4) (e.g., as described above with reference to FIG. 6A). In some examples, the side of the third layer L3 opposite substrate 616 can be coated with adhesive 614 and adhered to the second layer L2 of touch sensor panel 600 (e.g., the layer of elongated electrodes 602 can be adhered to the layers of touch node electrodes 606). In some examples, adhesive 614 can be an optically clear adhesive (OCA) and/or a pressure sensitive adhesive (PSA). In some examples, adhesive 514 can be an adhesive that compresses with pressure. Substrate 612 and/or 616 can be made of any transparent substrate material, such as plastic, glass, quartz, silicone, or a rigid or flexible (e.g., compressible or compliant under pressure) composite. In some examples, substrate 612 and 616 can be made of the same material. In some examples, substrate 612 and 616 can be made of different material. In some examples, substrate 616 and/or adhesive 614 can be made of a flexible (e.g., compressible or compliant under pressure) material, such that the distance between L1 and L3 and/or L4, between L2 and L3 and/or L4, and/or between L3 and L4 can change (e.g., reduce) when pressure is applied to touch sensor panel 600. It should be noted that while layers L1-L4 are described as being formed by ITO, these layers can be formed any other conductive material.

Figure 6C:
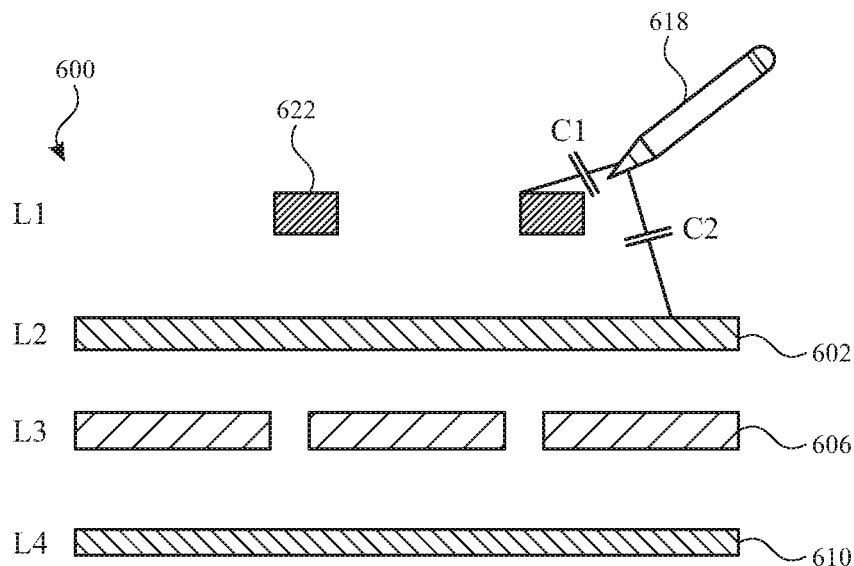

FIG. 6C illustrates the operation of touch sensor panel 600 to detect activity of an active stylus in a mutual capacitance mode according to examples of the disclosure. In particular, in some examples, touch sensor panel 600 can be configured in a stylus detection mode. During that mode, elongated electrodes 602, elongated electrodes 622, and/or touch node electrodes 606 can be configured to operate as sense electrodes (e.g., by coupling elongated electrodes 602, elongated electrodes 622, and/or touch node electrodes 606 to sensing circuitry 414 of FIG. 4). An active stylus 618 can generate stimulation signals (effectively operating as a drive electrode). During a stylus scan at touch sensor panel 600, the stimulation signals can be injected by stylus 618 into the touch sensor panel 600 and can cause mutual capacitive coupling C1 between the stylus 618 and the elongated electrodes 622 in the first layer (e.g., L1) and/or capacitive coupling C2 between the stylus 618 and the elongated electrodes 602 in the second layer (e.g., L2). The capacitances C1 and C2 and/or the changes in capacitances C1 and C2 can be sensed at the location of a particular elongated electrode 622 and/or at the location of a particular elongated electrodes 602 by one or more touch sensing circuits for processing (e.g., as illustrated in FIG. 4). In some examples, during the stylus scan, stimulation signals are not applied to elongated electrodes 622 and/or 602 apart from signals generated by the active stylus 618; rather, elongated electrodes 602 and/or touch node electrodes 606 are coupled to sense circuitry 414 in FIG. 4 for sensing stylus 618.

Figure 6D:
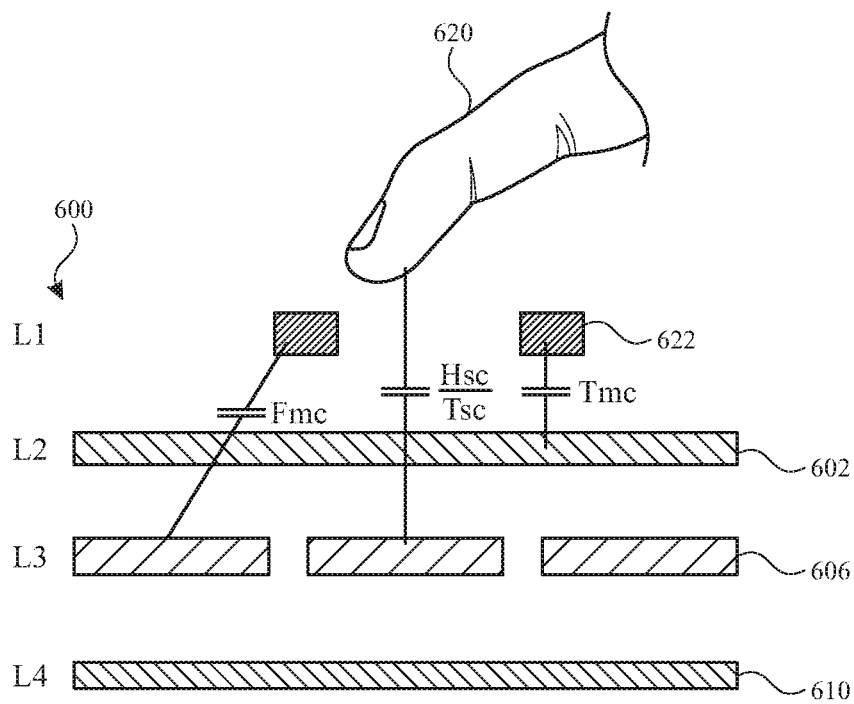

FIG. 6D illustrates the operation of touch sensor panel 600 to detect hover (proximity), touch, and/or force of an object (e.g., a finger) according to examples of the disclosure. For example, touch node electrodes 606 in the third layer (e.g., L3) of the touch sensor panel 600 can be operated as self-capacitance touch node electrodes (e.g., as described above with reference to FIG. 3) in a self-capacitance mode. While in this self-capacitance mode, capacitance coupling $H_{sc}$ (e.g., hovering event) and/or $T_{sc}$ (e.g., touch event) can occur between object 620 (e.g., finger) and self-capacitance touch node electrode 606. This capacitance coupling (e.g., $H_{sc}$ and/or $T_{sc}$) at the location of the particular touch node electrode 606 can be detected to indicate a touch or proximity event (e.g., as described above with reference to FIG. 3). Touch sensor panel 600 can also be operated in a mutual capacitance mode. For example, elongated electrodes 622 in the first layer (e.g., L1) of the touch sensor panel 600 can be operated as sense/drive electrodes (e.g., by coupling elongated electrodes 622 to sensing circuitry 414 of FIG. 4) and elongated electrodes 602 in the second layer (e.g., L2) of the touch sensor panel 600 can be operated as drive/sense electrodes (e.g., by coupling elongated electrodes 602 to stimulation signal 406 of FIG. 4) in the mutual capacitance mode (e.g., as described above with reference to FIG. 4). This configuration can cause mutual capacitive coupling $T_{mc}$ between elongated electrodes 622 and elongated electrodes 602. When a finger or object 620 approaches the touch node created by an intersection of an elongated electrode 622 and an elongated electrode 602, mutual capacitance $T_{mc}$ can be altered. This change in mutual capacitance $T_{mc}$ at the location of the intersection of a particular elongated electrode 622 and a particular elongated electrode 602 can be detected to indicate a touch or proximity at the location of the touch node (e.g., as described above with reference to FIG. 4). In some examples, elongated electrodes 622 in the first layer (e.g., L1) of the touch sensor panel 600 can be operated as sense/drive electrodes and the touch node electrodes 606 in the third layer (e.g., L3) of the touch sensor panel 600 can be operated as drive/sense electrodes (e.g., as groups of rows or columns) (e.g., as described above with reference to FIG. 4). For example, a row of touch node electrodes 606 can be stimulated by a stimulation signal (e.g., an AC voltage signal). This stimulation signal can be capacitively coupled to elongated electrode 622 through mutual capacitance $F_{mc}$ between the row of touch node electrodes 606 (e.g., drive electrode) and the elongated electrode 622 (e.g., sense electrode). When a finger or object 620 approaches the touch node created by the intersections of the row of touch node electrodes 606 (e.g., drive electrode) and elongated electrode 622, mutual capacitance $F_{mc}$ can be altered. This change in mutual capacitance $F_{mc}$ at the location of the intersection of a particular touch node electrode(s) 606 and a particular elongated electrode 622 can be detected to indicate a touch or proximity event at the location of the touch node (e.g. as described above with reference to FIG. 4). Moreover, when a pressure compliant or compressive material (e.g., a pressure sensitive adhesive (PSA), silicone, or any other material that compresses with pressure) is disposed between the second layer L2 and the third layer L3, the distance between elongated electrode 622 and touch node electrodes 606 can change, causing mutual capacitance $F_{mc}$ to change (e.g., as described above with reference to FIG. 6B). This change in mutual capacitance $F_{mc}$ at the location of the intersection of a particular elongated electrode 622 and a particular touch node electrode(s) 606 can be detected to indicate a force event at the location of the touch node. Additionally or alternatively when a pressure compliant or compressive material (e.g., a pressure sensitive adhesive (PSA), silicone, or any other material that compresses with pressure) is disposed between the third layer L3 and the fourth layer L4, the distance between touch node electrodes 606 and conductive material 610 can change, causing mutual capacitance $F_{mc}$ to change (e.g., as described above with reference to FIG. 6B).

FIGS. 6E-6K illustrate exemplary tables describing different modes of operation for exemplary touch sensor panel configurations with four layers of electrodes according to examples of the disclosure. Specifically, the table illustrated in FIG. 6E shows the different modes in which touch sensor panel 600 can be operated. For example, FIG. 6E shows that touch sensor panel 600 can be used for stylus sensing S (e.g., as described above with reference to FIG. 6C), touch/hover sensing in a self-capacitance configuration SC (e.g., as described above with reference to FIG. 6D), touch sensing in a mutual capacitance configuration MC1-MC8 (e.g., as described above with reference to FIG. 6D), and force sensing F1-F6 (e.g., as described above with reference to FIG. 6D). For example, the table in FIG. 6E illustrates that stylus sensing mode S can be performed by operating the elongated electrodes 622 in the first layer (e.g., L1) and elongated electrodes 602 in the second layer (e.g., L2) of touch sensor panel 600 as sense electrodes (e.g., by coupling elongated electrodes 602 and 622 to sensing circuitry 414 in FIG. 4), and operating the conductive material 610 in the fourth layer (e.g., L4) as a guard electrode (e.g., by operating the conductive material 610 at a reference voltage as previously described). In some examples, the touch node electrodes in the third layer (e.g., L3) of the touch sensor panel can be operated as self-capacitance touch node electrodes (e.g., as described above with reference to FIG. 3), sense lines/electrodes (e.g., as described above with reference to FIG. 4), drive lines/electrodes (e.g., as described above with reference to FIG. 4), or can be tied to ground, or left floating during the stylus sensing mode S.

In another example, the table in FIG. 6E illustrates that touch/hover sensing mode SC can be performed by operating the touch node electrodes 606 in the third layer (e.g., L3) of touch sensor panel 600 as self-capacitance touch node electrodes (e.g., as described above with reference to FIG. 3) and operating the elongated electrodes 622 in the first layer (e.g., L1), the elongated electrodes 602 in the second layer (e.g., L2), and the conductive material disposed on the fourth layer (e.g., L4) of the touch sensor panel 600 as guard electrodes.

In another example, the table in FIG. 6E illustrates that touch sensing modes MC1/2 can be performed by operating elongated electrodes 622 in the first layer (e.g., L1) of touch sensor panel 600 as sense/drive electrodes (e.g., coupling elongated electrodes 622 to sensing circuitry 414 of FIG. 4 in mode MC1 and coupling elongated electrodes 622 to stimulation signal 406 of FIG. 4 in mode MC2), operating elongated electrodes 602 in the second layer (e.g., L2) of touch sensor panel 600 as drive/sense electrodes (e.g., coupling elongated electrodes 602 to stimulation signal 406 of FIG. 4 in mode MC1 and coupling elongated electrodes 602 to sensing circuitry 414 of FIG. 4 in mode MC2), and operating the conductive material 610 in the fourth layer (e.g., L4) as a guard electrode (e.g., by operating the conductive material 610 at a reference voltage as previously described). In some examples, the touch node electrodes 606 in the third layer (e.g., L3) of the touch sensor panel 600 can be operated as self-capacitance touch node electrodes (e.g., as described above with reference to FIG. 3), sense lines/electrodes (e.g., as described above with reference to FIG. 4), drive lines/electrodes (e.g., as described above with reference to FIG. 4), or guard electrodes (e.g., by operating the touch node electrodes 606 at a reference voltage as previously described), or can be tied to ground, or left floating during the touch sensing modes MC1/2. In another example, the table in FIG. 6E illustrates that touch sensing modes MC3/4 can be performed by operating elongated electrodes 602 in the second layer (e.g., L2) of touch sensor panel 600 as sense/drive electrodes (e.g., coupling elongated electrodes 602 to sensing circuitry 414 of FIG. 4 in mode MC3 and coupling elongated electrodes 602 to stimulation signal 406 of FIG. 4 in mode MC4), operating touch node electrodes 606 in the third layer (e.g., L3) of touch sensor panel 600 as drive/sense electrodes (e.g., groups of touch node electrodes forming rows or columns) (e.g., coupling elongated electrodes 606 to stimulation signal 406 of FIG. 4 in mode MC3 and coupling touch node electrodes 606 to sensing circuitry 414 of FIG. 4 in mode MC4), and operating the conductive material 610 in the fourth layer (e.g., L4) as a guard electrode (e.g., by operating the conductive material 610 at a reference voltage as previously described). In some examples, the elongated electrodes 622 in the first layer (e.g., L1) of the touch sensor panel 600 can be operated as self-capacitance touch node electrodes (e.g., as described above with reference to FIG. 3), sense electrodes (e.g., as described above with reference to FIG. 4), drive electrodes (e.g., as described above with reference to FIG. 4), or guard, or can be tied to ground, or left floating during the touch sensing modes MC3/4. In another example, the table in FIG. 6E illustrates that touch sensing modes MC5/6 can be performed by operating elongated electrodes 622 in the first layer (e.g., L1) of touch sensor panel 600 as sense/drive electrodes (e.g., coupling elongated electrodes 622 to sensing circuitry 414 of FIG. 4 in mode MC5 and coupling elongated electrodes 622 to stimulation signal 406 of FIG. 4 in mode MC6), operating touch node electrodes 606 in the third layer (e.g., L3) of touch sensor panel 600 as drive/sense electrodes (e.g., groups of touch node electrodes forming rows or columns) (e.g., coupling touch node electrodes 606 to stimulation signal 406 of FIG. 4 in mode MC5 and coupling touch node electrodes 606 to sensing circuitry 414 of FIG. 4 in mode MC6), and operating the conductive material 610 in the fourth layer (e.g., L4) as a guard electrode (e.g., by operating the conductive material 610 at a reference voltage as previously described). In some examples, the elongated electrodes 602 in the second layer (e.g., L2) of the touch sensor panel 600 can be operated as self-capacitance touch node electrodes, sense electrodes, drive electrodes, or guard, or can be tied to ground, or left floating during the touch sensing modes MC5/6. In another example, the table in FIG. 6E illustrates that touch sensing modes MC7/8 can be performed by operating elongated electrodes 622 in the first layer (e.g., L1) of touch sensor panel 600 as sense/drive electrodes (e.g., coupling elongated electrodes 622 to sensing circuitry 414 of FIG. 4 in mode MC7 and coupling elongated electrodes 622 to stimulation signal 406 of FIG. 4 in mode MC8) and operating elongated electrodes 602 in the second layer (e.g., L2) of touch sensor panel 600 as drive/sense electrodes (e.g., coupling elongated electrodes 602 to stimulation signal 406 of FIG. 4 in mode MC7 and coupling elongated electrodes 602 to sensing circuitry 414 of FIG. 4 in mode MC8). In some examples, the touch node electrodes 606 in the third layer (e.g., L3) of the touch sensor panel 600 can be operated as self-capacitance touch node electrodes (e.g., as described above with reference to FIG. 3), sense lines/electrodes (e.g., as described above with reference to FIG. 4), drive lines/electrodes (e.g., as described above with reference to FIG. 4), guard electrodes (e.g., by operating the touch node electrodes 606 at a reference voltage as previously described), or can be tied to ground, or left floating during the touch sensing modes MC7/8. In some examples, the conductive material 610 in the fourth layer (e.g., L4) of the touch sensor panel 600 can be operated as a self-capacitance touch node electrode (e.g., as described above with reference to FIG. 3), sense electrode (e.g., as described above with reference to FIG. 4), drive electrode (e.g., as described above with reference to FIG. 4), guard electrode (e.g., by operating the conductive material 610 at a reference voltage as previously described), or can be tied to ground, or left floating during the touch sensing modes MC7/8.

In another example, the table in FIG. 6E illustrates that force sensing modes F1/2 can be performed by operating elongated electrodes 622 in the first layer (e.g., L1) of touch sensor panel 600 as sense/drive electrodes (e.g., coupling elongated electrodes 622 to sensing circuitry 414 of FIG. 4 in mode F1 and coupling elongated electrodes 622 to stimulation signal 406 of FIG. 4 in mode F2), operating groups of touch node electrodes 606 (e.g., groups of rows or columns) in the third layer (e.g., L3) of touch sensor panel 600 as a drive/sense electrodes (e.g., coupling touch node electrodes 606 to stimulation signal 406 of FIG. 4 in mode F1 and coupling touch node electrodes 606 to sensing circuitry 414 of FIG. 4 in mode F2), and operating the conductive material 610 in the fourth layer (e.g., L4) as a guard electrode (e.g., by operating the conductive material 610 at a reference voltage as previously described). In some examples, elongated electrodes 602 in the second layer (e.g., L2) of touch sensor panel 600 can be operated as sense electrodes (e.g., as described above with reference to FIG. 4), drive electrodes (e.g., as described above with reference to FIG. 4), self-capacitance touch node electrodes (e.g., as described above with reference to FIG. 3), or guard, or can be tied to ground, or left floating during the force sensing modes F1/2. In another example, the table in FIG. 6E illustrates that force sensing modes F3/4 can be performed by operating elongated electrodes 602 in the second layer (e.g., L2) of touch sensor panel 600 as sense/drive electrodes (e.g., coupling elongated electrodes 602 to sensing circuitry 414 of FIG. 4 in mode F3 and coupling elongated electrodes 602 to stimulation signal 406 of FIG. 4 in mode F4), operating groups of touch node electrodes 606 (e.g., groups of rows or columns) in the third layer (e.g., L3) of touch sensor panel 600 as a drive/sense electrodes (e.g., coupling touch node electrodes 606 to stimulation signal 406 of FIG. 4 in mode F3 and coupling touch node electrodes 606 to sensing circuitry 414 of FIG. 4 in mode F4), and operating the conductive material 610 in the fourth layer (e.g., L4) as a guard electrode (e.g., by operating the conductive material 610 at a reference voltage as previously described). In some examples, elongated electrodes 622 in the first layer (e.g., L1) of touch sensor panel 600 can be operated as sense electrodes (e.g., as described above with reference to FIG. 4), drive electrodes (e.g., as described above with reference to FIG. 4), self-capacitance touch node electrodes (e.g., as described above with reference to FIG. 3), or guard, or can be tied to ground, or left floating during the force sensing modes F3/4. In another example, the table in FIG. 6E illustrates that force sensing modes F5/6 can be performed by operating touch node electrodes 606 in the third layer (e.g., L3) of touch sensor panel 600 as sense/drive electrodes (e.g., groups of rows or columns) (e.g., coupling touch node electrodes 606 to sensing circuitry 414 of FIG. 4 in mode F5 and coupling touch node electrodes 606 to stimulation signal 406 of FIG. 4 in mode F6), and operating the conductive material 610 in the fourth layer (e.g., L4) of touch sensor panel 600 as a drive/sense layer (e.g., coupling conductive material 610 to stimulation signal 406 of FIG. 4 in mode F4 and coupling conductive material 610 to sensing circuitry 414 of FIG. 4 in mode F5) (e.g., as described above with reference to FIG. 6D). In some examples, elongated electrodes 622 in the first layer (e.g., L1) and elongated electrodes 602 of touch sensor panel 600 can be operated as sense electrodes (e.g., as described above with reference to FIG. 4), drive electrodes (e.g., as described above with reference to FIG. 4), self-capacitance touch node electrodes (e.g., as described above with reference to FIG. 3), or guard, or can be tied to ground, or left floating during the force sensing modes F5/6.

FIG. 6F illustrates a table showing additional details about stylus sensing mode S that can be performed using the touch sensor panel of the disclosure. For example, FIG. 6F illustrates that stylus sensing mode S-A can be performed by operating both the elongated electrodes 622 in the first layer (e.g., L1) and the elongated electrodes 602 in the second layer (e.g., L2) of touch sensor panel 600 as sense electrodes (e.g., as described above with reference to FIG. 4), operating at least one of the touch node electrode 606 in the third layer (e.g., L3) of touch sensor panel 600 as sense line(s)/electrode(s) (e.g., as described above with reference to FIG. 4) while coupling the remaining touch node electrodes 606 to a voltage source (e.g., operate them as guard) and/or ground, and operating the conductive material 610 in the fourth layer (e.g., L4) of the touch sensor panel 600 as a guard electrode (e.g., by operating the conductive material 610 at a reference voltage as previously described). It should be understood that the electrodes operating as sense electrodes need not be sensed at the same time (e.g., can be sensed sequentially). In another example, FIG. 6F illustrates that stylus sensing mode S-B can be performed by operating both the elongated electrodes 622 in the first layer (e.g., L1) and the elongated electrodes 602 in the second layer (e.g., L2) of touch sensor panel 600 as sense electrodes (e.g., as described above with reference to FIG. 4), operating at least one row/column of touch node electrodes 606 (e.g., grouping touch node electrodes to form a row or a column) in the third layer (e.g., L3) of touch sensor panel 600 as sense electrode(s) (e.g., as described above with reference to FIG. 4) while coupling the remaining touch node electrodes 606 to a voltage source (e.g., operate them as guard) and/or ground, and operating the conductive material 610 in the fourth layer (e.g., L4) of the touch sensor panel 600 as a guard electrode (e.g., by operating the conductive material 610 at a reference voltage as previously described). It should be understood that the row(s)/column(s) of touch node electrodes 606 operating as sense electrodes need not be sensed at the same time (e.g., can be sensed sequentially). In another example, FIG. 6F illustrates that stylus sensing mode S-C can be performed by operating both the elongated electrodes 622 in the first layer (e.g., L1) and the elongated electrodes 602 in the second layer (e.g., L2) of touch sensor panel 600 as sense electrodes (e.g., as described above with reference to FIG. 4), operating all rows/columns of touch node electrodes 606 (e.g., grouping touch node electrodes to form rows or columns) in the third layer (e.g., L3) of touch sensor panel 600 as sense electrodes (e.g., as described above with reference to FIG. 4), and operating the conductive material 610 in the fourth layer (e.g., L4) as a guard layer (e.g., by operating the conductive material 610 at a reference voltage as previously described). In another example, FIG. 6F illustrates that stylus sensing mode S-D can be performed by operating both the elongated electrodes 622 in the first layer (e.g., L1) and the elongated electrodes 602 in the second layer (e.g., L2) of touch sensor panel 600 as sense electrodes (e.g., by operating the conductive material 610 at a reference voltage as previously described), and operating the touch node electrodes 606 in the third layer (e.g., L3) of touch sensor panel 600 and the conductive material 610 in the fourth layer (e.g., L4) as a guard electrodes (e.g., by operating the touch node electrodes 606 and conductive material 610 at a reference voltage as previously described).

FIG. 6G illustrates a table showing additional touch panel configurations in which touch/hover sensing mode SC can be performed. For example, FIG. 6G illustrates that touch/hover sensing mode SC-A can be performed by operating all of the touch node electrodes 606 in the third layer (e.g., L3) of touch sensor panel 600 as self-capacitance touch node electrodes (e.g., as described above with reference to FIG. 3) and operating the elongated electrodes 622 in the first layer (e.g., L1), the elongated electrodes 602 in the second layer (e.g., L2), and the conductive material 610 disposed on the fourth layer (e.g., L4) of the touch sensor panel 600 as guard (e.g., by operating the elongated electrodes 602 and conductive material 610 at a reference voltage as previously described). In another example, FIG. 6G illustrates that touch/hover sensing mode SC-B can be performed by operating a subset of the touch node electrodes 606 (e.g., a group, a row, a column, etc.) in the third layer (e.g., L3) of touch sensor panel 600 as self-capacitance touch node electrodes (e.g., as described above with reference to FIG. 3) while coupling the remaining touch node electrodes 606 in the third layer (e.g., L3) of touch sensor panel 600 to a voltage source (e.g., operate them as guard), and operating the elongated electrodes 622 in the first layer (e.g., L1), the elongated electrodes 602 in the second layer (e.g., L2), and the conductive material disposed on the fourth layer (e.g., L4) of the touch sensor panel 600 as guard (e.g., by operating elongated electrodes 622, elongated electrodes 602, and conductive material 610 at a reference voltage as previously described). For example, in a 3×3 touch node electrode configuration, the subset of the touch node electrodes 606 operated as self-capacitance touch node electrodes can be the first row of the 3×3 touch node electrode configuration and the remaining touch node electrodes 606 in the second and third rows of the 3×3 touch node electrode configuration can be coupled to a voltage source (e.g., operated as guard). In another example, FIG. 6G illustrates that touch/hover sensing mode SC-C can be performed by operating a subset of the touch node electrodes 606 (e.g., a group, a row, a column, etc.) in the third layer (e.g., L3) of touch sensor panel 600 as self-capacitance touch node electrodes (e.g., as described above with reference to FIG. 3), coupling the remaining touch node electrodes 606 in the third layer (e.g., L3) of touch sensor panel 600 to ground, and operating the elongated electrodes 622 in the first layer (e.g., L1), the elongated electrodes 602 in the second layer (e.g., L2), and the conductive material disposed on the fourth layer (e.g., L4) of the touch sensor panel 600 as guard. For example, in a 3×3 touch node electrode configuration, the subset of the touch node electrodes 606 operated as self-capacitance touch node electrodes can be the second row of the 3×3 touch node electrode configuration and the remaining touch node electrodes 606 in the first and third rows of the 3×3 touch node electrode configuration can be coupled to ground. In another example, FIG. 6G illustrates that touch/hover sensing mode SC-D can be performed by operating a first subset of touch node electrodes 606 (e.g., a group, a row, a column, etc.) in the third layer (e.g., L3) of touch sensor panel 600 as self-capacitance touch node electrodes (e.g., as described above with reference to FIG. 3), operating a second subset of touch node electrodes 606 (e.g., a group, a row, a column, etc.) in the third layer (e.g., L3) of touch sensor panel 600 as guards, tying the remaining touch node electrodes 606 in the third layer (e.g., L3) of touch sensor panel 600 to ground, and operating the elongated electrodes 622 in the first layer (e.g., L1), the elongated electrodes 602 in the second layer (e.g., L2), and the conductive material 610 disposed on the fourth layer (e.g., L4) of the touch sensor panel 600 as guard (e.g., by operating elongated electrodes 622, elongated electrodes 602, and conductive material 610 at a reference voltage as previously described). For example, in a 3×3 touch node electrode configuration, the first row of touch node electrodes 606 in the 3×3 touch node electrode configuration can be operated as self-capacitance touch node electrodes, the second row of touch node electrodes 606 in the 3×3 touch node electrode configuration can be coupled to a voltage source (e.g., operated as guard), and the third row of touch node electrodes 606 in the 3×3 touch node electrode configuration can be coupled to ground.

FIG. 6H illustrates a table showing additional details about touch sensing mode MC3 that can be performed using the touch sensor panel of the disclosure. For example, FIG. 6H illustrates that touch sensing mode MC3-A can be performed by operating elongated electrodes 602 in the second layer (e.g., L2) of touch sensor panel 600 as sense electrodes, operating at least one touch node electrode 606 in the third layer (e.g., L3) of touch sensor panel 600 as drive line(s)/electrode(s) (e.g., as described above with reference to FIG. 4) while coupling the remaining touch node electrodes 606 to a voltage source (e.g., operate them as guard) and/or ground, and operating the conductive material 610 in the fourth layer (e.g., L4) as a guard layer (e.g., as described above with reference to FIGS. 4 and 6D). In some examples, elongated electrodes 622 in the first layer (e.g., L1) of touch sensor panel 600 can be operated as sense electrodes, drive electrodes, self-capacitance touch node electrodes, or guard, or can be tied to ground, or left floating during the touch sensing mode MC3-A. In another example, FIG. 6H illustrates that touch sensing mode MC3-B can be performed by operating elongated electrodes 602 in the second layer (e.g., L2) of touch sensor panel 600 as sense electrodes (e.g., as described above with reference to FIG. 4), operating at least one row or column of touch node electrodes 606 (e.g., by grouping touch node electrodes to form rows or columns) in the third layer (e.g., L3) of touch sensor panel 600 as drive line(s)/electrode(s) (e.g., as described above with reference to FIG. 4) while coupling the remaining touch node electrodes 606 to a voltage source (e.g., operate them as guard) and/or ground, and operating the conductive material 610 in the fourth layer (e.g., L4) as a guard layer (e.g., as described above with reference to FIGS. 4 and 6D). For example, in a 3×3 touch node electrode configuration, the first row of touch node electrodes 606 in the 3×3 touch node electrode configuration can be operated as a drive electrode and the remaining touch node electrodes 606 in the second and third rows of the 3×3 touch node electrode configuration can be coupled to a voltage source (e.g., operated as guard) and/or ground. In some examples, elongated electrodes 622 in the first layer (e.g., L1) of touch sensor panel 600 can be operated as sense electrodes, drive electrodes, self-capacitance touch node electrodes (e.g., as described above with reference to FIGS. 3-4), or guard, or can be tied to ground, or left floating during the touch sensing mode MC3-B. In another example, FIG. 6H illustrates that touch sensing mode MC3-C can be performed by operating elongated electrodes 602 in the second layer (e.g., L2) of touch sensor panel 600 as sense electrodes, operating all rows or columns of touch node electrodes 606 (e.g., by grouping touch node electrodes to form rows or columns) in the third layer (e.g., L3) of touch sensor panel 600 as a drive electrodes (e.g., as described above with reference to FIG. 4), and operating the conductive material 610 in the fourth layer (e.g., L4) as a guard layer (e.g., as described above with reference to FIGS. 4 and 6D). In some examples, elongated electrodes 622 in the first layer (e.g., L1) of touch sensor panel 600 can be operated as sense electrodes, drive electrodes, self-capacitance touch node electrodes (e.g., as described above with reference to FIGS. 3-4), or guard, or can be tied to ground, or left floating during the touch sensing mode MC3-C.

FIG. 6I illustrates a table showing additional details about touch sensing mode MC4 that can be performed using the touch sensor panel of the disclosure. For example, FIG. 6I illustrates that touch sensing mode MC4-A can be performed operating elongated electrodes 602 in the second layer (e.g., L2) of touch sensor panel 600 as drive electrodes, operating at least one touch node electrode 606 in the third layer (e.g., L3) of touch sensor panel 600 as a sense line/electrode (e.g., as described above with reference to FIG. 4) while coupling the remaining touch node electrodes 606 to a voltage source (e.g., operate them as guard) and/or ground, and operating the conductive material 610 in the fourth layer (e.g., L4) as a guard electrode (e.g., by operating the conductive material 610 at a reference voltage as previously described). In some examples, elongated electrodes 622 in the first layer (e.g., L1) of touch sensor panel 600 can be operated as sense electrodes, drive electrodes, self-capacitance touch node electrodes (e.g., as described above with reference to FIGS. 3-4), or guard, or can be tied to ground, or left floating during the touch sensing mode MC4-A. In another example, FIG. 6I illustrates that touch sensing mode MC4-B can be performed by operating elongated electrodes 602 in the second layer (e.g., L2) of touch sensor panel 600 as drive electrodes (e.g., as described above with reference to FIG. 4), operating at least one row or column of touch node electrodes 606 (e.g., by grouping touch node electrodes to form rows or columns) in the third layer (e.g., L3) of touch sensor panel 600 as sense line(s)/electrode(s) (e.g., as described above with reference to FIG. 4) while coupling the remaining touch node electrodes 606 to a voltage source (e.g., operate them as guard) and/or ground, and operating the conductive material 610 in the fourth layer (e.g., L4) as a guard electrode (e.g., by operating the conductive material 610 at a reference voltage as previously described). In some examples, elongated electrodes 622 in the first layer (e.g., L1) of touch sensor panel 600 can be operated as sense electrodes, drive electrodes, self-capacitance touch node electrodes (e.g., as described above with reference to FIGS. 3-4), or guard, or can be tied to ground, or left floating during the touch sensing mode MC4-B. For example, in a 3×3 touch node electrode configuration, the first row of touch node electrodes 606 in the 3×3 touch node electrode configuration can be operated as a sense electrode (e.g., as described above with reference to FIG. 4) and the remaining touch node electrodes 606 in the second and third rows of the 3×3 touch node electrode configuration can be coupled to a voltage source (e.g., operated as guard) and/or ground. In another example, FIG. 6I illustrates that touch sensing mode MC4-C can be performed by operating elongated electrodes 602 in the second layer (e.g., L2) of touch sensor panel 600 as drive electrodes (e.g., as described above with reference to FIG. 4), operating all rows or columns of touch node electrodes 606 (e.g., by grouping touch node electrodes to form rows or columns) in the third layer (e.g., L3) of touch sensor panel 600 as a sense electrodes (e.g., as described above with reference to FIG. 4), and operating the conductive material 610 in the fourth layer (e.g., L4) as a guard electrode (e.g., by operating the conductive material 610 at a reference voltage as previously described). In some examples, elongated electrodes 622 in the first layer (e.g., L1) of touch sensor panel 600 can be operated as sense electrodes, drive electrodes, self-capacitance touch node electrodes (e.g., as described above with reference to FIGS. 3-4), or guard, or can be tied to ground, or left floating during the touch sensing mode MC4-C.

FIG. 6J illustrates a table showing additional details about touch sensing mode MC5 can be performed using the touch sensor of the disclosure. For example, FIG. 6J illustrates that touch sensing mode MC5-A can be performed by operating elongated electrodes 622 in the first layer (e.g., L1) of touch sensor panel 600 as sense electrodes (e.g., as described above with reference to FIG. 4), operating at least one touch node electrode 606 in the third layer (e.g., L3) of touch sensor panel 600 as a drive line(s)/electrode(s) (e.g., as described above with reference to FIG. 4) while coupling the remaining touch node electrodes 606 to a voltage source (e.g., operate them as guard) and/or ground, and operating the conductive material 610 in the fourth layer (e.g., L4) as a guard electrode (e.g., by operating the conductive material 610 at a reference voltage as previously described). In some examples, elongated electrodes 602 in the second layer (e.g., L2) of touch sensor panel 600 can be operated as sense electrodes, drive electrodes, self-capacitance touch node electrodes (e.g., as described above with reference to FIGS. 3-4), or guard, or can be tied to ground, or left floating during the touch sensing mode MC5-A. In another example, FIG. 6J illustrates that touch sensing mode MC5-B can be performed by operating elongated electrodes 622 in the first layer (e.g., L1) of touch sensor panel 600 as sense electrodes (e.g., as described above with reference to FIG. 4), operating at least one row or column of touch node electrodes 606 (e.g., by grouping touch node electrodes to form rows or columns) in the third layer (e.g., L3) of touch sensor panel 600 as drive line(s)/electrode(s) (e.g., as described above with reference to FIG. 4) while coupling the remaining touch node electrodes 606 to a voltage source (e.g., operate them as guard) and/or ground, and operating the conductive material 610 in the fourth layer (e.g., L4) as a guard electrode (e.g., by operating the conductive material 610 at a reference voltage as previously described). In some examples, elongated electrodes 602 in the second layer (e.g., L2) of touch sensor panel 600 can be operated as sense electrodes, drive electrodes, self-capacitance touch node electrodes (e.g., as described above with reference to FIGS. 3-4), or guard, or can be tied to ground, or left floating during the touch sensing mode MC5-B. For example, in a 3×3 touch node electrode configuration, the first row of touch node electrodes 606 in the 3×3 touch node electrode configuration can be operated as a drive electrode and the remaining touch node electrodes 606 in the second and third rows of the 3×3 touch node electrode configuration can be coupled to a voltage source (e.g., operated as guard) and/or ground. In another example, FIG. 6J illustrates that touch sensing mode MC5-C can be performed by operating elongated electrodes 622 in the first layer (e.g., L1) of touch sensor panel 600 as sense electrodes, operating all rows or columns of touch node electrodes 606 (e.g., by grouping touch node electrodes to form rows or columns) in the third layer (e.g., L3) of touch sensor panel 600 as a drive electrodes (e.g., as described above with reference to FIG. 4), and operating the conductive material 610 in the fourth layer (e.g., L4) as a guard layer (e.g., as described above with reference to FIGS. 4 and 6D). In some examples, elongated electrodes 602 in the second layer (e.g., L2) of touch sensor panel 600 can be operated as sense electrodes, drive electrodes, self-capacitance touch node electrodes (e.g., as described above with reference to FIGS. 3-4), or guard, or can be tied to ground, or left floating during the touch sensing mode MC5-C.

FIG. 6K illustrates a table showing additional details about how touch sensing mode MC6 can be performed using the touch sensor of the disclosure. For example, FIG. 6K illustrates that touch sensing mode MC6-A can be performed operating elongated electrodes 622 in the first layer (e.g., L1) of touch sensor panel 600 as drive electrodes (e.g., as described above with reference to FIG. 4), operating at least one touch node electrode 606 in the third layer (e.g., L3) of touch sensor panel 600 as a sense line/electrode (e.g., as described above with reference to FIG. 4) while coupling the remaining touch node electrodes 606 to a voltage source (e.g., operate them as guard) and/or ground, and operating the conductive material 610 in the fourth layer (e.g., L4) as a guard electrode (e.g., by operating the conductive material 610 at a reference voltage as previously described). In some examples, elongated electrodes 602 in the second layer (e.g., L2) of touch sensor panel 600 can be operated as sense electrodes, drive electrodes, self-capacitance touch node electrodes (e.g., as described above with reference to FIGS. 3-4), or guard, or can be tied to ground, or left floating during the touch sensing mode MC6-A. In another example, FIG. 6K illustrates that touch sensing mode MC6-B can be performed by operating elongated electrodes 622 in the first layer (e.g., L1) of touch sensor panel 600 as drive electrodes (e.g., as described above with reference to FIG. 4), operating at least one row or column of touch node electrodes 606 (e.g., by grouping touch node electrodes to form rows or columns) in the third layer (e.g., L3) of touch sensor panel 600 as sense line(s)/electrode(s) (e.g., as described above with reference to FIG. 4) while coupling the remaining touch node electrodes 606 to a voltage source (e.g., operate them as guard) and/or ground, and operating the conductive material 610 in the fourth layer (e.g., L4) as a guard electrode (e.g., by operating the conductive material 610 at a reference voltage as previously described). In some examples, elongated electrodes 602 in the second layer (e.g., L2) of touch sensor panel 600 can be operated as sense electrodes, drive electrodes, self-capacitance touch node electrodes (e.g., as described above with reference to FIGS. 3-4), or guard, or can be tied to ground, or left floating during the touch sensing mode MC6-B. For example, in a 3×3 touch node electrode configuration, the first row of touch node electrodes 606 in the 3×3 touch node electrode configuration can be operated as a sense electrode (e.g., as described above with reference to FIG. 4) and the remaining touch node electrodes 606 in the second and third rows of the 3×3 touch node electrode configuration can be coupled to a voltage source (e.g., operated as guard) and/or ground. In another example, FIG. 6K illustrates that touch sensing mode MC6-C can be performed by operating elongated electrodes 622 in the first layer (e.g., L1) of touch sensor panel 600 as drive electrodes (e.g., as described above with reference to FIG. 4), operating all rows or columns of touch node electrodes 606 (e.g., by grouping touch node electrodes to form rows or columns) in the third layer (e.g., L3) of touch sensor panel 600 as a sense electrodes (e.g., as described above with reference to FIG. 4), and operating the conductive material 610 in the fourth layer (e.g., L4) as a guard electrode (e.g., by operating the conductive material 610 at a reference voltage as previously described). In some examples, elongated electrodes 602 in the second layer (e.g., L2) of touch sensor panel 600 can be operated as sense electrodes, drive electrodes, self-capacitance touch node electrodes, or guard, or can be tied to ground, or left floating during the touch sensing mode MC6-C.

Figure 7:
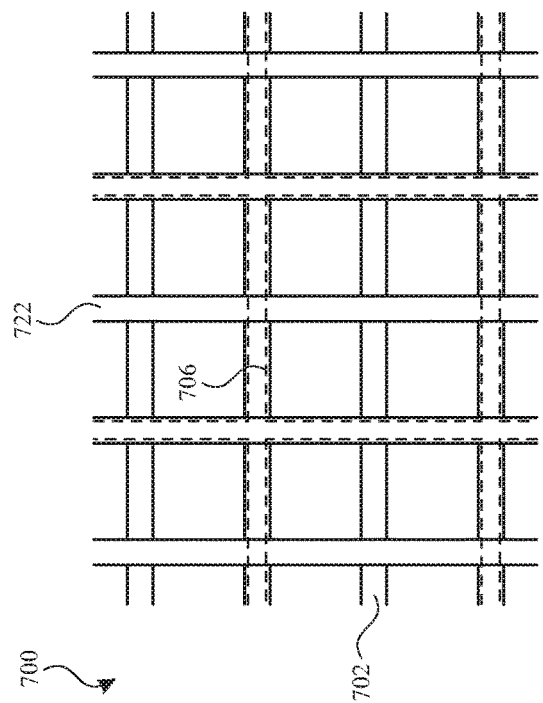
FIG. 7 illustrates an exemplary touch sensor panel configuration with four layers of electrodes according to examples of the disclosure.

FIG. 7 illustrates an exemplary touch sensor panel configuration 700 with four layers of electrodes according to examples of the disclosure. Specifically, FIG. 7 illustrates touch sensor panel configuration 700 that is similar to the touch sensor panel configuration 600, as described with reference to FIGS. 6A-6K, with elongated electrodes 722, elongated electrodes 702, and touch node electrodes 706 in FIG. 7 corresponding to electrodes 622, elongated electrodes 602, and touch node electrodes 606 in FIG. 6, respectively. Thus, the cross-section of touch sensor panel configuration 700 can be as illustrated in FIG. 6B, except for the lateral dimensions of touch node electrodes 706 and/or the placement of elongated electrodes 702 and 722 with respect to touch node electrodes 706. In particular, the touch node electrodes 706 in FIG. 7 can have a larger surface area than the touch node electrodes 606 in FIG. 6 (in the example of FIG. 7, four times the area of touch node electrodes 606 in FIG. 6). Moreover, the elongated electrodes 722 and 702 can be disposed within the regions of the touch sensor panel that are occupied by touch node electrodes 706 as illustrated in FIG. 7, and not simply at or near the edges or boundaries of touch node electrodes 706 as illustrated in FIG. 6 (e.g., elongated electrodes 722 and 702 can be disposed over inner regions of touch node electrodes 706 as well as over boundary regions or regions between touch node electrodes 706). In some examples, touch node electrodes 706 in FIG. 7 can have a surface area substantially similar to touch node electrodes 606 in FIG. 6, and touch sensor panel 700 can simply include additional elongated electrodes 722 and 702 that can be arranged across the regions of the touch sensor panel that are occupied by touch node electrodes 706 as illustrated in FIG. 7 (e.g., elongated electrodes 722 and 702 can be disposed at a higher frequency/rate with respect to touch node electrodes 706 in touch sensor panel 700 than are elongated electrodes 622 and 602 in touch sensor panel 600. For example, in FIG. 6, along a given dimension, the rate at which elongated electrodes 622 and 602 are disposed can be one for every touch node electrode 606, whereas in FIG. 7, the rate at which elongated electrodes 722 and 702 are disposed can be two for every touch node electrode 706). The configuration of touch sensor panel 700 can allow the touch sensor panel to detect hover events in the z-axis at greater distances (e.g., utilizing self-capacitance sensing of touch node electrodes 706 in the circumstance in which touch node electrodes 706 are larger than touch node electrodes 606) and/or greater accuracy (e.g., utilizing a greater number of elongated electrodes 702 and 722 in the circumstance in which touch node electrodes 706 are the same size as touch node electrodes 606). Moreover, having touch node electrodes 706 with a larger surface area, and thus having fewer touch node electrodes 706 for a given touch sensor panel size, can reduce the number of traces in the third layer (e.g., L3) of touch sensor panel 700 needed to couple those touch node electrodes 706 to sense circuitry (e.g., circuitry 314 in FIG. 3 or circuitry 414 in FIG. 4). It should be noted that touch sensor panel 700 can operate in any of the modes of operation, including the manners of operation, described above with reference to FIGS. 6A-6K.

Figure 8:
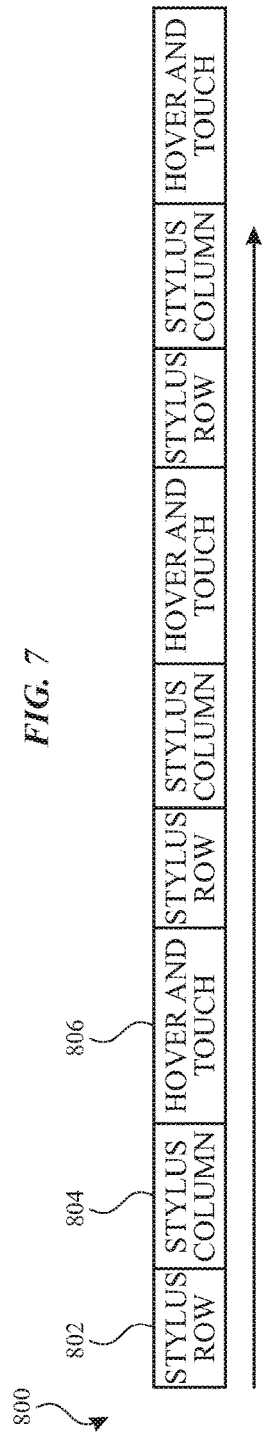
FIG. 8 illustrates an exemplary timeline 800 of the modes of operation for exemplary touch sensor panel configurations according to examples of the disclosure.

FIG. 8 illustrates an exemplary timeline 800 of the modes of operation for exemplary touch sensor panel configurations according to examples of the disclosure. Specifically, timeline 800 shows stylus row sensing 802 being performed in which row(s) of electrodes (e.g., elongated electrodes 602 and/or groups of touch node electrodes 606) are sensed in a mutual capacitance sense mode to detect a stylus (e.g., as described above with reference to FIGS. 6C, 6E, and 6F). Timeline 800 then shows stylus column sensing 804 is being performed in which column(s) of electrodes (e.g., elongated electrodes 622 and/or groups of touch node electrodes 606) are sensed in a mutual capacitance sense mode to detect a stylus (e.g., as described above with reference to FIGS. 6C, 6E, and 6F). Finally, timeline 800 shows hover and touch sensing 806 being performed in which touch node electrodes are sensed in a self-capacitance mode to detect a hover and/or touch event (e.g., as described above with reference to FIGS. 6D, 6E, and 6G). This pattern of stylus row sensing 802, followed by stylus column sensing 804, and followed by hover and touch sensing 806 can be repeated continuously as illustrated in FIG. 8. In some examples, stylus sensing 802 and 804 are combined and performed simultaneously. In some examples, the duration of stylus row sensing 802 and stylus column sensing 804 can be the same. In some examples, the duration of stylus row sensing 802 and stylus column sensing 804 can be different. In some examples, hover and touch sensing 806 is not performed if a stylus is detected. For example, if a stylus is detected in stylus row 802 and/or stylus column sensing 804, stylus row 802 and stylus column sensing 804 can be repeated in an alternating fashion while skipping the hover and touch sensing mode 806. In some examples, hover and touch sensing 806 may be performed in a mutual capacitance mode (e.g., as described above with reference to FIGS. 6D, 6E, and 6H-6K).

Figure 9A:
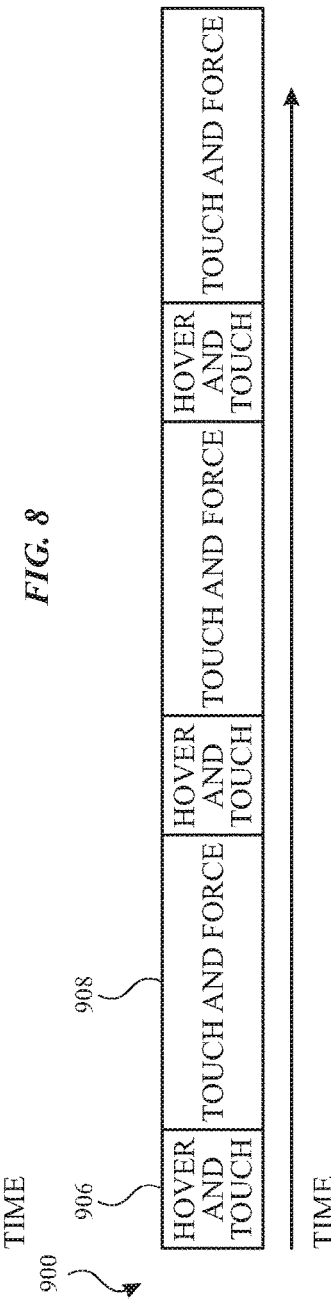
FIG. 9A illustrates another exemplary timeline of the modes of operation for exemplary touch sensor panel configurations according to examples of the disclosure.

FIG. 9A illustrates another exemplary timeline 900 of the modes of operation for exemplary touch sensor panel configurations according to examples of the disclosure. Specifically, timeline 900 shows hover and touch sensing 906 being performed in which touch node electrodes are sensed in a self-capacitance mode to detect a hover and/or touch event (e.g., as described above with reference to FIGS. 5D, 5E, 5G, 6D, 6E, and 6G). Timeline 900 also shows touch and force sensing 908 (e.g., as described above with reference to FIGS. 5D, 5E, 5G-5I, 6D, 6E, and 6G-6K) being performed after hover and touch sensing 906. In some examples, touch and force sensing 908 is not performed when a hover or touch event is not detected (e.g., as described with reference to FIG. 9B below), because it can be the case that if no hover/touch is detected, there cannot be a force to detect, either. In some examples, the durations of hover and touch sensing 906 and touch and force sensing 908 are the same. In some examples, the durations of hover and touch sensing 906 and touch and force sensing 908 are different. In some examples, touch sensing and force sensing can be performed simultaneously. For example, touch sensing mode MC1 and force sensing mode F6 can be performed at the same time (e.g., such that changes in mutual capacitance between the electrodes in L1 and L2 and between electrodes in L3 and L4 are detected as described above).

FIG. 9B illustrates an exemplary process 950 for switching between modes of operation of exemplary touch sensor panel configurations according to examples of the disclosure. Specifically, exemplary process 950 performs a scan for hover and/or touch events at step 960 (e.g., as described above with reference to FIGS. 5D, 5E, 5G, 6D, 6E, and 6G). For example, process 950 can operate the touch sensor panel in the self capacitance mode SC as described above with reference to FIG. 5G or 6G to perform touch/hover sensing. At step 962, process 650 determines whether a touch or hover event is detected. If a touch or hover event is not detected at step 962, process 950 enters a sleep mode for a set period of time at step 964. In some examples, the period of time (e.g., duration) of the sleep mode is duration of time the touch sensor panel would take performing a touch and/or force scan. In some examples, the period of time (e.g., duration) of the sleep mode is a fixed duration of time. Process 950 returns to step 960 upon completion of the sleep mode in step 964. If a touch or hover event is detected at step 962, process 950 performs a scan for a touch and/or force event (e.g., as described above with reference to FIGS. 5D, 5E, 5G, 5I, 6D, 6E, and 6G-6K). For example, process 950 can operate the touch sensor panel in any of the mutual capacitance modes to perform touch sensing (e.g., as described with reference to modes MC1-MC2 of FIGS. 5E and 5H-5I, and modes MC1-MC8 of FIGS. 6E and 6H-6K) and/or force sensing (e.g., as described with reference to modes F1-F4 of FIG. 5E and modes F1-F6 of FIG. 6E). Process 950 returns to step 960 upon completion of the touch and/or force scan in step 966.

FIG. 10 illustrates an exemplary timeline of the modes of operation for exemplary touch sensor panel configurations according to examples of the disclosure. Specifically, timeline 1000 shows stylus row sensing 1002 being performed in which row(s) of electrodes are sensed in a mutual capacitance mode to detect a stylus (e.g., as described above with reference to FIGS. 6C, 6E, and 6F). Timeline 1000 then shows stylus column sensing 1004 is being performed in which column(s) of electrodes are sensed in a mutual capacitance mode to detect a stylus (e.g., as described above with reference to FIGS. 6C, 6E, and 6F). Next, timeline 1000 shows hover and touch sensing 1006 being performed in which touch node electrodes are sensed in a self-capacitance mode to detect a hover and/or touch event (e.g., as described above with reference to FIGS. 6D, 6E, and 6G). Finally, timeline 1000 shows touch and/or force sensing 1008 being performed (e.g., as described above with reference to FIGS. 6D, 6E, and 6G-6K). This pattern of stylus row sensing 1002, followed by stylus column sensing 1004, followed by hover and touch sensing 1006, and followed by touch and/or force sensing 1008 can be repeated continuously as illustrated in FIG. 10. In some examples, stylus sensing 1002 and 1004 are combined and performed simultaneously. In some examples, the duration of stylus sensing 1002 and stylus sensing 1004 can be the same. In some examples, the duration of stylus row sensing 1002 and stylus column sensing 1004 can be different. In some examples, touch and/or force sensing 1008 is not performed when a hover or touch event is not detected (e.g., as described with reference to FIG. 9B above), because it can be the case that if no hover/touch is detected, there cannot be a force to detect, either. Instead, the touch sensor panel enters a sleep mode (e.g., as described with reference to FIG. 9B above) or simply performs the stylus row sensing 1002, followed by stylus column sensing 1004, and hover and/or touch sensing 1006 without performing the touch and/or force sensing 1008 (e.g., touch and/or force sensing 1008 is skipped if not hover or touch event is detected).

Thus, the examples of the disclosure provide various touch sensor panel configurations that allow for various electrodes to be used in hover, touch, force, and/or stylus sensing and/or guarding functions, which can improve the touch sensing performance of the system while reducing the number of electrodes and corresponding routing traces.

Therefore, according to the above, some examples of the disclosure are directed to a touch sensor panel comprising: a first layer including a plurality of electrodes of a first type, wherein the electrodes of the first type are coupled to respective traces, and the electrodes of the first type are configured to, during a first time period, operate as touch sensing electrodes; and a second layer including a plurality of electrodes of a second type overlapping with the respective traces of the electrodes of the first type, wherein the electrodes of the second type are configured to: during the first time period, operate as guard electrodes for the respective traces of the electrodes of the first type; and during a second time period, operate as touch sensing electrodes. Additionally or alternatively to one or more of the examples disclosed above, in some examples, the first type of electrodes are a different type of electrode than the second type of electrodes. Additionally or alternatively to one or more of the examples disclosed above, in some examples, the first type of electrodes are touch node electrodes; and the second type of electrodes are elongated electrodes. Additionally or alternatively to one or more of the examples disclosed above, in some examples, operating, during the first time period, the electrodes of the second type as the guard electrodes comprises driving the electrodes of the second type at a reference voltage. Additionally or alternatively to one or more of the examples disclosed above, in some examples, operating, during the first time period, the electrodes of the first type as the touch sensing electrodes comprises operating the electrodes of the first type as self-capacitance sensing electrodes. Additionally or alternatively to one or more of the examples disclosed above, in some examples, operating the electrodes of the second type as the touch sensing electrodes comprises operating the electrodes of the second type as mutual capacitance electrodes. Additionally or alternatively to one or more of the examples disclosed above, in some examples, a third layer including an electrode of a third type configured to, during the first and second time periods, operate as a guard electrode. Additionally or alternatively to one or more of the examples disclosed above, in some examples, the electrode of the third type is further configured to: during a third time period, operate as a force sensing electrode. Additionally or alternatively to one or more of the examples disclosed above, in some examples, the first type of electrodes are further configured to: during the third time period, operate as force sensing electrodes, wherein during the third time period, a force is determined based on the electrode of the third type and the electrodes of the first type. Additionally or alternatively to one or more of the examples disclosed above, in some examples, the second type of electrodes are further configured to: during the third time period, operate as force sensing electrodes, wherein during the third time period, a force is determined based on the electrode of the third type and the electrodes of the second type. Additionally or alternatively to one or more of the examples disclosed above, in some examples, a third layer including a plurality of electrodes of a third type, wherein the electrodes of the third type are configured to: during the first time period, operate as guard electrodes for the respective traces of the electrodes of the first type; and during the second time period, operate as touch sensing electrodes. Additionally or alternatively to one or more of the examples disclosed above, in some examples, the first type of electrodes are touch node electrodes; and the second and third types of electrodes are elongated electrodes. Additionally or alternatively to one or more of the examples disclosed above, in some examples, operating, during the first time period, the electrodes of the second and third types as the guard electrodes comprises driving the electrodes of the second and third types at a reference voltage. Additionally or alternatively to one or more of the examples disclosed above, in some examples, operating, during the first time period, the electrodes of the first type as the touch sensing electrodes comprises operating the electrodes of the first type as self-capacitance sensing electrodes. Additionally or alternatively to one or more of the examples disclosed above, in some examples, operating, during the second time period, the electrodes of the second type as the touch sensing electrodes comprises operating the electrodes of the second type as mutual capacitance electrodes with respect to the electrodes of the third type; and operating, during the second time period, the electrodes of the third type as the touch sensing electrodes comprises operating the electrodes of the third type as mutual capacitance electrodes with respect to the electrodes of the second type. Additionally or alternatively to one or more of the examples disclosed above, in some examples, operating, during the first time period, the electrodes of the first type as the touch sensing electrodes comprises operating the electrodes of the first type as self-capacitance sensing electrodes. Additionally or alternatively to one or more of the examples disclosed above, in some examples, the electrodes of the first type are further configured to: during a third time period, operate as mutual capacitance electrodes. Additionally or alternatively to one or more of the examples disclosed above, in some examples, the electrodes of the second type are further configured to: during the third time period, operate as mutual capacitance electrodes with respect to the electrodes of the first type. Additionally or alternatively to one or more of the examples disclosed above, in some examples, the electrodes of the third type are further configured to: during the third time period, operate as mutual capacitance electrodes with respect to the electrodes of the first type. Additionally or alternatively to one or more of the examples disclosed above, in some examples, operating the electrodes of the second type as the touch sensing electrodes comprises operating the electrodes of the second type as mutual capacitance electrodes with respect to the electrodes of the third type; and operating the electrodes of the third type as the touch sensing electrodes comprises operating the electrodes of the third type as mutual capacitance electrodes with respect to the electrodes of the second type. Additionally or alternatively to one or more of the examples disclosed above, in some examples, a fourth layer including an electrode of a fourth type configured to, during the first, second, and third time periods, operate as a guard electrode. Additionally or alternatively to one or more of the examples disclosed above, in some examples, the electrode of the fourth type is further configured to: during a fourth time period, operate as a force sensing electrode. Additionally or alternatively to one or more of the examples disclosed above, in some examples, operating the electrodes of the first type as mutual capacitance electrodes comprises operating the electrodes of the first type as force sensing electrodes, wherein during the fourth time period, a force is determined based on the electrode of the fourth type and the electrodes of the first type. Additionally or alternatively to one or more of the examples disclosed above, in some examples, the plurality of electrodes of the second type are arranged in rows along a horizontal axis, and include extensions along a vertical axis that overlap with the respective traces of the electrodes of the first type.

Some examples of the disclosure are directed to a method for operating a touch sensor panel comprising: a first layer including a plurality of electrodes of a first type, wherein the electrodes of the first type are configured to, during a first time period, operate as mutual capacitance drive electrodes; and a second layer including a plurality of electrodes of a second type overlapping with the electrodes of the first type, wherein the electrodes of the second type are configured to: during the first time period, operate as mutual capacitance sense electrodes; and during a second time period, operate as self-capacitance electrodes. Additionally or alternatively to one or more of the examples disclosed above, in some examples, the plurality of electrodes of the second type are arranged in rows along a horizontal axis, a given row of electrodes of the second type includes a plurality of individually addressable electrodes of the second type, during the first time period, the plurality of individually addressable electrodes of the second type in the given row are sensed with the same sense circuitry, and during the second time period, the plurality of individually addressable electrodes of the second type in the given row are sensed with different sense circuitry. Additionally or alternatively to one or more of the examples disclosed above, in some examples, the plurality of electrodes of the first type are arranged in columns along a vertical axis, a given column of electrodes of the first type includes a plurality of individually addressable electrodes of the first type, and during the first time period, the plurality of individually addressable electrodes of the first type in the given column are drive with the same drive signal. Additionally or alternatively to one or more of the examples disclosed above, in some examples, the plurality of electrodes of the first type and the plurality of electrodes of the second type are grouped to form a plurality of super nodes on the touch sensor panel, and each super node is individually operable to perform independent touch sensing operations.

Some examples of the disclosure are directed to a method for operating a touch sensor panel, the method comprising: operating a plurality of electrodes of a first type, during a first time period, as touch sensing electrodes, wherein the electrodes of the first type are in a first layer of the touch sensor panel and are coupled to respective traces; and operating a plurality of electrodes of a second type: during the first time period, as guard electrodes for the respective traces of the electrodes of the first type; and during a second time period, as touch sensing electrodes, wherein the electrodes of the second type are in a second layer of the touch sensor panel and overlap with the respective traces of the electrodes of the first type.

Some examples of the disclosure are directed to a non-transitory computer readable storage medium storing one or more programs, the one or more programs comprising instructions, which when executed by a processor, cause the processor to perform a method for operating a touch sensor panel comprising: operating a plurality of electrodes of a first type, during a first time period, as touch sensing electrodes, wherein the electrodes of the first type are in a first layer of the touch sensor panel and are coupled to respective traces; and operating a plurality of electrodes of a second type: during the first time period, as guard electrodes for the respective traces of the electrodes of the first type; and during a second time period, as touch sensing electrodes, wherein the electrodes of the second type are in a second layer of the touch sensor panel and overlap with the respective traces of the electrodes of the first type.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel comprising:
a first layer including a plurality of electrodes of a first type, wherein the electrodes of the first type are coupled to respective traces, and the electrodes of the first type are configured to, during a first time period and a second time period, operate as touch sensing electrodes; and
a second layer including a plurality of electrodes of a second type overlapping with the respective traces of the electrodes of the first type, wherein the electrodes of the second type are configured to:
during the first time period, operate as guard electrodes for the respective traces of the electrodes of the first type; and
during the second time period, be coupled to sensing circuitry and operate as electrodes that are sensed for touch via the sensing circuitry.

2. The touch sensor panel of claim 1, wherein the first type of electrodes are a different type of electrode than the second type of electrodes.

3. The touch sensor panel of claim 2, wherein:
the first type of electrodes are touch node electrodes; and
the second type of electrodes are elongated electrodes.

4. The touch sensor panel of claim 1, wherein operating, during the first time period, the electrodes of the second type as the guard electrodes comprises driving the electrodes of the second type at a reference voltage.

5. The touch sensor panel of claim 1, wherein operating, the electrodes of the first type as the touch sensing electrodes comprises operating the electrodes of the first type as self-capacitance sensing electrodes.

6. The touch sensor panel of claim 1, wherein operating the electrodes of the second type as electrodes that are sensed for touch comprises operating the electrodes of the second type as mutual capacitance electrodes.

7. The touch sensor panel of claim 1, further comprising:
a third layer including an electrode of a third type configured to, during the first and second time periods, operate as a guard electrode.

8. The touch sensor panel of claim 7, wherein the electrode of the third type is further configured to:
during a third time period, operate as a force sensing electrode.

9. The touch sensor panel of claim 8, wherein the first type of electrodes are further configured to:
during the third time period, operate as force sensing electrodes, wherein during the third time period, a force is determined based on the electrode of the third type and the electrodes of the first type.

10. The touch sensor panel of claim 8, wherein the second type of electrodes are further configured to:
during the third time period, operate as force sensing electrodes, wherein during the third time period, a force is determined based on the electrode of the third type and the electrodes of the second type.

11. The touch sensor panel of claim 1, further comprising:
a third layer including a plurality of electrodes of a third type, wherein the electrodes of the third type are configured to:
during the first time period, operate as guard electrodes for the respective traces of the electrodes of the first type; and
during the second time period, be coupled to sensing circuitry and operate as electrodes that are sensed for touch via the sensing circuitry.

12. The touch sensor panel of claim 11, wherein:
the first type of electrodes are touch node electrodes; and
the second and third types of electrodes are elongated electrodes.

13. The touch sensor panel of claim 11, wherein:
operating, during the first time period, the electrodes of the second and third types as the guard electrodes comprises driving the electrodes of the second and third types at a reference voltage.

14. The touch sensor panel of claim 11, wherein operating, during the first time period, the electrodes of the first type as the touch sensing electrodes comprises operating the electrodes of the first type as self-capacitance sensing electrodes.

15. The touch sensor panel of claim 11, wherein:
operating, during the second time period, the electrodes of the second type as electrodes that are sensed for touch comprises operating the electrodes of the second type as mutual capacitance electrodes with respect to the electrodes of the third type; and
operating, during the second time period, the electrodes of the third type as the touch sensing electrodes comprises operating the electrodes of the third type as mutual capacitance electrodes with respect to the electrodes of the second type.

16. The touch sensor panel of claim 15, wherein operating, during the first time period, the electrodes of the first type as the touch sensing electrodes comprises operating the electrodes of the first type as self-capacitance sensing electrodes.

17. The touch sensor panel of claim 11, wherein the electrodes of the first type are further configured to:
during a third time period, operate as mutual capacitance electrodes.

18. The touch sensor panel of claim 17, wherein the electrodes of the second type are further configured to:
during the third time period, operate as mutual capacitance electrodes with respect to the electrodes of the first type.

19. The touch sensor panel of claim 17, wherein the electrodes of the third type are further configured to:
during the third time period, operate as mutual capacitance electrodes with respect to the electrodes of the first type.

20. The touch sensor panel of claim 17, further comprising:
a fourth layer including an electrode of a fourth type configured to, during the first, second, and third time periods, operate as a guard electrode.

21. The touch sensor panel of claim 20, wherein the electrode of the fourth type is further configured to:
during a fourth time period, operate as a force sensing electrode.

22. The touch sensor panel of claim 21, wherein operating the electrodes of the first type as mutual capacitance electrodes comprises operating the electrodes of the first type as force sensing electrodes, wherein during the fourth time period, a force is determined based on the electrode of the fourth type and the electrodes of the first type.

23. The touch sensor panel of claim 11, wherein operating the electrodes of the second type as electrodes that are sensed for touch comprises operating the electrodes of the second type as mutual capacitance electrodes with respect to the electrodes of the third type; and
operating the electrodes of the third type as the touch sensing electrodes comprises operating the electrodes of the third type as mutual capacitance electrodes with respect to the electrodes of the second type.

24. The touch sensor panel of claim 1, wherein:
the plurality of electrodes of the second type are arranged in rows along a horizontal axis, and include extensions along a vertical axis that overlap with the respective traces of the electrodes of the first type.

25. The touch sensor panel of claim 1, wherein operating the electrodes of the second type as electrodes that sense touch comprises operating the electrodes of the second type as self-capacitance electrodes.

26. A touch sensor panel comprising:
a first layer including a plurality of electrodes of a first type, wherein the electrodes of the first type are configured to, during a first time period, operate as mutual capacitance drive electrodes; and
a second layer including a plurality of electrodes of a second type overlapping with the electrodes of the first type, wherein the plurality of electrodes of the second type are arranged in a plurality of rows and columns, and a respective row or column of the plurality of rows and columns in the second layer includes at least a first electrode and a second electrode of the second type, and the first electrode and second electrode are configured to:
during the first time period, operate as a combined mutual capacitance sense electrode comprising the first electrode and the second electrode that are sensed by a same sensing circuitry; and
during a second time period, operate as self-capacitance electrodes that are sensed individually by different sense circuitry.

27. The touch sensor panel of claim 26, wherein:
during the first time period, the plurality of electrodes of the second type in the respective row or column are sensed with the same sense circuitry.

28. The touch sensor panel of claim 27, wherein:
the plurality of electrodes of the first type are arranged in columns along a vertical axis,
a given column of electrodes of the first type includes a plurality of individually addressable electrodes of the first type, and
during the first time period, the plurality of individually addressable electrodes of the first type in the given column are driven with a same drive signal.

29. The touch sensor panel of claim 28, wherein the plurality of electrodes of the first type and the plurality of electrodes of the second type are grouped to form a plurality of super nodes on the touch sensor panel, and each super node is individually operable to perform independent touch sensing operations.

30. The touch sensor panel of claim 26, wherein the plurality of electrodes of the first type operate as self-capacitance electrodes that are sensed for touch during the second time period.

31. A method for operating a touch sensor panel, the method comprising:
operating a plurality of electrodes of a first type, during a first time period and a second time period, as touch sensing electrodes, wherein the electrodes of the first type are in a first layer of the touch sensor panel and are coupled to respective traces; and
operating a plurality of electrodes of a second type:
during the first time period, as guard electrodes for the respective traces of the electrodes of the first type; and
during the second time period, as electrodes that are sensed for touch via sensing circuitry coupled to the plurality of electrodes of the second type,
wherein the electrodes of the second type are in a second layer of the touch sensor panel and overlap with the respective traces of the electrodes of the first type.

32. A non-transitory computer readable storage medium storing one or more programs, the one or more programs comprising instructions, which when executed by a processor, cause the processor to perform a method for operating a touch sensor panel comprising:
operating a plurality of electrodes of a first type, during a first time period and a second time period, as touch sensing electrodes, wherein the electrodes of the first type are in a first layer of the touch sensor panel and are coupled to respective traces; and
operating a plurality of electrodes of a second type:
during the first time period, as guard electrodes for the respective traces of the electrodes of the first type; and
during the second time period, as electrodes that are sensed for touch via sensing circuitry coupled to the plurality of electrodes of the second type,
wherein the electrodes of the second type are in a second layer of the touch sensor panel and overlap with the respective traces of the electrodes of the first type.

* * * * *